(12) United States Patent
Farnsworth et al.

(10) Patent No.: US 12,441,214 B2
(45) Date of Patent: Oct. 14, 2025

(54) FUEL CELL POWER MANAGEMENT SYSTEM

(71) Applicant: TOYOTA MOTOR ENGINEERING & MANUFACTURING NORTH AMERICA, INC., Plano, TX (US)

(72) Inventors: Jared M. Farnsworth, San Francisco, CA (US); Andrew G. Sata, Irvine, CA (US); Daniel C. Folick, Los Alamitos, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 165 days.

(21) Appl. No.: 18/503,094

(22) Filed: Nov. 6, 2023

(65) Prior Publication Data
US 2025/0145014 A1    May 8, 2025

(51) Int. Cl.
*B60L 58/40*    (2019.01)
*B60L 15/20*    (2006.01)
(Continued)

(52) U.S. Cl.
CPC .............. *B60L 58/40* (2019.02); *B60L 15/20* (2013.01); *H01M 16/006* (2013.01);
(Continued)

(58) Field of Classification Search
CPC ...... B60L 58/40; B60L 15/20; H01M 16/006; H01M 2250/20; H01M 2250/402;
(Continued)

(56) References Cited

U.S. PATENT DOCUMENTS 6,799,119 B1    9/2004    Voorhees et al.
7,402,353 B2    7/2008    Shaffer et al.
(Continued)

FOREIGN PATENT DOCUMENTS

DE    102014215160 A1    2/2016

OTHER PUBLICATIONS

Das et al.; Evaluation of Power Sharing Mechanism of a PEM Fuel Cell-Battery Powered Electric Vehicle; 2023 4th International Conference on Clean and Green Energy Engineering (CGEE); Ankara, Turkey; Aug. 26-28, 2023 (Year: 2023).*

*Primary Examiner* — Michael J Zanelli
(74) *Attorney, Agent, or Firm* — HAYNES AND BOONE, LLP

(57) ABSTRACT

A vehicle includes a fuel cell power management system including: a fuel cell; a battery; a charge sensor operatively coupled to the battery; a speedometer; and a processor that includes a memory. The processor is configured to calculate a mapping of desired fuel cell power output as a function of the battery charge and the speed of the vehicle and, using the mapping, the battery charge, the speed of the vehicle, and a motor power request, calculate the desired traction power output of the fuel cell. The processor then sets the traction power output of the fuel cell to the desired traction power output of the fuel cell, sets the desired traction power output of the battery to the motor power request minus the traction power output of the fuel cell, and sets the traction power output of the battery to the desired traction power output of the battery.

20 Claims, 15 Drawing Sheets

(51) Int. Cl.
*H01M 16/00* (2006.01)
*H02J 7/00* (2006.01)

(52) U.S. Cl.
CPC ....... *H02J 7/0048* (2020.01); *H01M 2250/20* (2013.01); *H01M 2250/402* (2013.01)

(58) Field of Classification Search
CPC ............. H01M 8/0494; H01M 2220/20; H02J 7/0048; Y02E 60/50; Y02T 90/40
See application file for complete search history.

(56) References Cited

U.S. PATENT DOCUMENTS

| | | |
|---|---|---|
| 7,588,847 B2 | 9/2009 | Maier et al. |
| 7,829,229 B1 | 11/2010 | Maier et al. |
| 7,847,513 B2 | 12/2010 | Maier et al. |
| 8,859,158 B2 | 10/2014 | Kwon et al. |
| 9,490,494 B2 | 11/2016 | Kakeno et al. |
| 11,424,464 B2 | 8/2022 | Sakai et al. |
| 2011/0111318 A1 | 5/2011 | Bernard et al. |
| 2015/0283915 A1 | 10/2015 | Kim et al. |
| 2022/0203844 A1 | 6/2022 | Sujan et al. |
| 2022/0340048 A1 | 10/2022 | Li et al. |
| 2023/0182585 A1 | 6/2023 | Koti et al. |
| 2023/0211706 A1 | 7/2023 | Weber |

\* cited by examiner

FUEL CELL POWER MANAGEMENT SYSTEM

TECHNICAL FIELD

The subject matter described herein relates to devices and methods for splitting power output of a vehicle between a fuel cell and a battery. This technology has particular but not exclusive utility for cars and trucks.

BACKGROUND

Hydrogen-powered vehicles may include a hydrogen-powered fuel cell that generates electrical energy by combining hydrogen gas with atmospheric oxygen, as well as a battery that stores and releases electrical energy. The fuel cell and battery provide electrical power to an electric motor that drives the vehicle. The fuel cell can include an anode catalyst that contains platinum nanoparticles and carbon. Under certain conditions, the fuel cell can be degraded by sintering of the platinum nanoparticles, which melts nanoparticles together and reduces their total surface area. The fuel cell can also be degraded by oxidation of the carbon, and by other factors. Degradation of the fuel cell can reduce its power output.

Fuel cell power degradation is a function of the fuel cell's operating voltage. Mechanisms for such degradation include:

1) High voltage, above an ideal operating range, and the number of crossings into high voltage.
2) Low voltage, below the ideal operating voltage range.
3) Large and/or rapid fluctuation of the voltage within the ideal operating range.

Traditional vehicle system power control assigns power to the fuel cell (e.g., the main power source). If the fuel cell cannot meet the total system power demand, then a battery (e.g., a hybrid system) will attempt to meet the system power demand gap. With this traditional control method, the fuel cell power demand can be highly dynamic and can include very low load and high load condition (e.g., frequently causing fuel cell overvoltage or undervoltage). As a result, fuel cell degradation can occur.

A need therefore exists for improved fuel cell power management systems that address these and other concerns.

The information included in this Background section of the specification, including any references cited herein and any description or discussion thereof, is included for technical reference purposes only and is not to be regarded as limiting.

SUMMARY

In accordance with at least one embodiment of the present disclosure, a fuel cell power management system is provided that splits the power output of the vehicle between the fuel cell and battery in a way that protects the fuel cell from degradation without sacrificing the responsiveness of the vehicle. The fuel cell power management system may protect against overvoltage, undervoltage, and voltage transient conditions, while also ensuring that any transient power demands that cannot be met by the battery will instead be met by the fuel cell. The fuel cell power management system may take into account such factors as road slope or grade. The fuel cell power management system disclosed herein has particular, but not exclusive, utility for cars and trucks.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a vehicle that includes a fuel cell power management system which includes a fuel cell, a battery, a charge sensor operatively coupled to the battery and configured to measure a battery charge of the battery, a speedometer configured to measure a speed of the vehicle, and a processor that includes a memory. The processor is configured to: calculate a mapping of desired fuel cell power output as a function of the battery charge and the speed of the vehicle; using the mapping, the battery charge, the speed of the vehicle, and a motor power request, calculate a desired traction power output of the fuel cell; set a traction power output of the fuel cell to the desired traction power output of the fuel cell; set a desired traction power output of the battery to the motor power request minus the traction power output of the fuel cell; and set a traction power output of the battery to the desired traction power output of the battery. Other embodiments of this aspect include corresponding computer systems, apparatus, and computer programs recorded on one or more computer storage devices, each configured to perform the actions of the methods.

Implementations may include one or more of the following features. In some embodiments, the processor is further configured to, if the desired traction power output of the battery exceeds a maximum power output of the battery, increase the desired traction power output of the fuel cell by an amount equal to the exceedance. In some embodiments, the processor is further configured to, if the increased desired traction power output of the fuel cell exceeds a maximum power output of the fuel cell, set the desired traction power output of the fuel cell equal to the maximum power output of the fuel cell. In some embodiments, the processor is further configured to, if the desired traction power output of the fuel cell is greater than a first threshold value, set the desired traction power output of the fuel cell equal to the first threshold value. In some embodiments, the first threshold value is associated with a fuel cell voltage of 0.7 volts. In some embodiments, the processor is further configured to, if the desired traction power output of the fuel cell is less than a second threshold value, set the desired traction power output of the fuel cell equal to the second threshold value. In some embodiments, the second threshold value is associated with a fuel cell voltage of 0.8 volts. In some embodiments, the processor is further configured to, if the battery charge exceeds a third threshold value, setting the desired traction power output of the fuel cell to zero. In some embodiments, the third threshold value is 75%. In some embodiments, the processor is further configured to, if the battery charge does not exceed the third threshold value, using at least some of the traction power output of the fuel cell to charge the battery, and setting the traction power output of the fuel cell at a level that will charge the battery within a specified amount of time. In some embodiments, the specified amount of time is 600 seconds. In some embodiments, the desired traction power output of the fuel cell is sufficient to overcome an actual road load of the vehicle. In some embodiments, the desired traction power output of the battery is sufficient to accelerate the vehicle. Implementations of the described techniques may include hardware, a method or process, or computer software on a computer-accessible medium.

One general aspect includes a method for fuel cell power management. The method includes, with a processor that includes a memory: measuring a battery charge of a battery of the vehicle; measuring a speed of the vehicle; calculating a mapping of desired fuel cell power output as a function of the battery charge and the speed of the vehicle; using the mapping, the battery charge, the speed of the vehicle, and a motor power request, calculating a desired traction power output of a fuel cell of the vehicle; setting a traction power output of the fuel cell to the desired traction power output of the fuel cell; setting a desired traction power output of the battery to the motor power request minus the traction power output of the fuel cell; and setting a traction power output of the battery to the desired traction power output of the battery. Other embodiments of this aspect include corresponding computer systems, apparatus, and computer programs recorded on one or more computer storage devices, each configured to perform the actions of the methods.

Implementations may include one or more of the following features. In some embodiments, the method may include, if the desired traction power output of the fuel cell is greater than a first threshold value associated with a fuel cell voltage of 0.7 volts, setting the desired traction power output of the fuel cell equal to the first threshold value. In some embodiments, the method may include: if the desired traction power output of the fuel cell is less than a second threshold value associated with a fuel cell voltage of 0.8 volts, setting the desired traction power output of the fuel cell equal to the second threshold value. In some embodiments, the desired traction power output of the fuel cell is sufficient to overcome an actual road load of the vehicle. In some embodiments, the desired traction power output of the battery is sufficient to accelerate the vehicle. Implementations of the described techniques may include hardware, a method or process, or computer software on a computer-accessible medium.

One general aspect includes a fuel cell power management system. The fuel cell power management system includes a vehicle; a fuel cell disposed within the vehicle; a battery disposed within the vehicle; a charge sensor operatively coupled to the battery and configured to measure a battery charge of the battery; a speedometer configured to measure a speed of the vehicle; and a processor disposed within the vehicle and including a memory. The processor is configured to: calculate a mapping of desired fuel cell power output as a function of the battery charge and the speed of the vehicle; using the mapping, the battery charge, the speed of the vehicle, and a motor power request, calculate a desired traction power output of the fuel cell; set a desired traction power output of the battery to the motor power request minus the desired traction power output of the fuel cell. The processor is also configured to, if the desired traction power output of the battery exceeds a maximum power output of the battery, increase the desired traction power output of the fuel cell by an amount equal to the exceedance; if the increased desired traction power output of the fuel cell exceeds a maximum power output of the fuel cell, set the desired traction power output of the fuel cell equal to the maximum power output of the fuel cell; set a traction power output of the fuel cell to the desired traction power output of the fuel cell; and set a traction power output of the battery to the desired traction power output of the battery. Other embodiments of this aspect include corresponding computer systems, apparatus, and computer programs recorded on one or more computer storage devices, each configured to perform the actions of the methods.

Implementations may include one or more of the following features. In some embodiments, the processor is further configured to: if the desired traction power output of the fuel cell is greater than a first threshold value associated with a fuel cell voltage of 0.7 volts, set the desired traction power output of the fuel cell equal to the first threshold value; and if the desired traction power output of the fuel cell is less than a second threshold value associated with a fuel cell voltage of 0.8 volts, set the desired traction power output of the fuel cell equal to the second threshold value. Implementations of the described techniques may include hardware, a method or process, or computer software on a computer-accessible medium.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the fuel cell power management system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
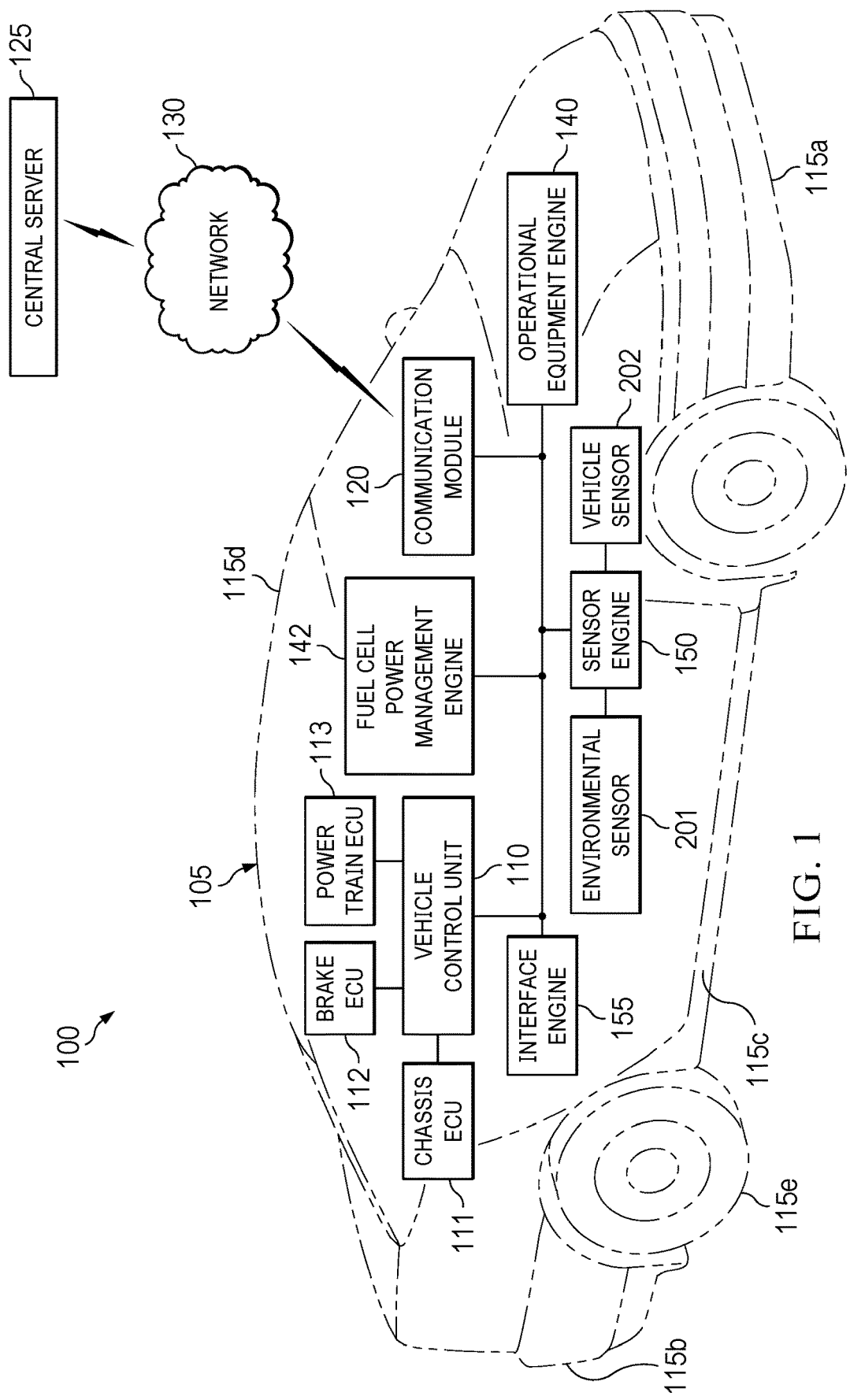
FIG. 1 is an illustration, in a block diagram form, of a fuel cell power management system in accordance with at least one embodiment of the present disclosure.

In accordance with at least one embodiment of the present disclosure, a fuel cell power management system is provided that optimizes the power split between the fuel cell and hybrid battery to mitigate or minimize fuel cell degradation over time.

Upon receiving a requested power output (e.g., based on a measured deflection of the accelerator pedal) the fuel cell power management system divides the required power output between conservative/recoverable, fast-response, high-transient forces such as a desired vehicle acceleration, and non-conservative/non-recoverable, slow-response, low-transient forces such as road load. In an example, road load may be the sum of aerodynamic drag, rolling resistance, and grade-related gravitational forces acting on the vehicle. In a broad sense, the fuel cell power management system overcomes road load forces using power output from the fuel cell, and meets moment-to-moment acceleration demands using power output from the battery. When demand on the battery and fuel cell are low, the power output of the fuel cell can be adjusted to a level that charges the battery over a specified amount of time (e.g., 30 seconds). This method of splitting the power output between the fuel cell and the battery has the effect of minimizing large or rapid transient changes in the power output from the fuel cell, and thus of the fuel cell's operating voltage.

Within its normal operating conditions, the power output of the fuel cell may be inversely proportional to its operating voltage, such that at voltages significantly above 0.8V, the power output is approximately zero, and below 0.7 V, the power output approaches the maximum power output of the fuel cell, $P_{FC\ Max}$. However, degradation of the fuel cell can occur both at voltages above 0.8V and at voltages below 0.7 V. Therefore, under nominal operating conditions, the fuel cell power management system limits the power output of the fuel cell to keep its operating voltage at or above 0.7 V, and also maintains a minimum power output from the fuel cell to keep its operating voltage at or below 0.8 V.

However, when the requested power output (e.g., based on the accelerator pedal position) exceeds the maximum power output of the battery plus the power output of the fuel cell at 0.7 V, the fuel cell power management system increases the power output of the fuel cell until the demand is met, even if this requires allowing the operating voltage of the fuel cell to fall below 0.7 V. Thus, the fuel cell power management system ensures that the driver's power request is met (up to the maximum power output of the battery and fuel cell), even at the cost of some fuel cell degradation, while at other times controlling the output of the battery and fuel cell to minimize such degradation.

The present disclosure aids substantially in maximizing the lifetime of the fuel cell, by minimizing the amount of time the fuel cell spends in overvoltage, undervoltage, and transient voltage change. Implemented on one or more processors within the vehicle, the fuel cell power management system disclosed herein provides practical, real-time control over the fuel cell's voltage and power output. This improved power management system transforms a vehicle with a limited fuel lifespan into one where degradation of the fuel cell over time is minimized, without the normally routine need for the driver to operate the vehicle in a fuel-cell-friendly manner. This unconventional approach improves the functioning of the vehicle, by reducing degradation of the fuel cell and thus extending the vehicle's lifespan.

The fuel cell power management system may be implemented as a combination of hardware and/or software modules, and operated by a control process executing on a processor circuit that accepts user inputs from the vehicle operator, and that is in communication with sensors to detect variables such as the battery state of charge and the degree of accelerator pedal deflection. In that regard, the control process performs certain specific operations in response to different inputs made at different times. In some cases, certain outputs of the fuel cell power management system may be shown on a display, indicated by audio alerts, or otherwise communicated to a user. In other cases, outputs of the fuel cell power management system may be visible to the user only insofar as they affect the lifespan and maximum power output of the fuel cell. Certain structures, functions, and operations of the processor circuit, sensors, and user input systems are recited herein to enable novel features or aspects of the present disclosure with particularity. These descriptions are provided for exemplary purposes only, and should not be considered to limit the scope of the fuel cell power management system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is an illustration, in a block diagram form, of a fuel cell power management system in accordance with at least one embodiment of the present disclosure. In an example, a fuel cell power management system is referred to by the reference numeral 100 and includes a vehicle 105, such as an automobile, and a vehicle control unit (VCU) 110 located on the vehicle 105. The vehicle 105 may include a front portion 115a (including a front bumper), a rear portion 115b (including a rear bumper), a right side portion 115c (including a right front quarter panel, a right front door, a right rear door, and a right rear quarter panel), a left side portion 115d (including a left front quarter panel, a left front door, a left rear door, and a left rear quarter panel), and wheels 115e. A communication module 120 may be operably coupled to, and adapted to be in communication with, the vehicle control unit 110. The communication module 120 may be adapted to communicate wirelessly with a central server 125 via a network 130 (e.g., a 3G network, a 4G network, a 5G network, a Wi-Fi network, or the like, including communicating via a combination of one or more or networks). The central server 125 may provide information and services including but not limited to include location, mapping, route or path, and topography information.

An operational equipment engine 140 is operably coupled to, and adapted to be in communication with, the vehicle control unit 110. A sensor engine 150 is operably coupled to, and adapted to be in communication with, the vehicle control unit 110. The sensor engine 150 is adapted to monitor various components of, for example, the operational equipment engine 140. An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the fuel cell power management system 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously referred to as an engine ECU, power plant ECU, motor ECU, or transmission ECU) that controls elements of the motor and drivetrain. The system also includes one or more environmental sensors 201, one or more vehicle sensors 202, and a fuel cell power management engine 142, the operation of which will be described below.

It is understood that other components or arrangements of components may be found in a vehicle 105. For example, a power train ECU 113 may control both motor and transmission components. Alternatively, a separate motor ECU and transmission ECU may exist, or some functions of a motor ECU or transmission ECU may be performed by the VCU 110.

Before continuing, it should be noted that the examples described above are provided for purposes of illustration, and are not intended to be limiting. Other devices and/or device configurations may be utilized to carry out the operations described herein.

Figure 2:
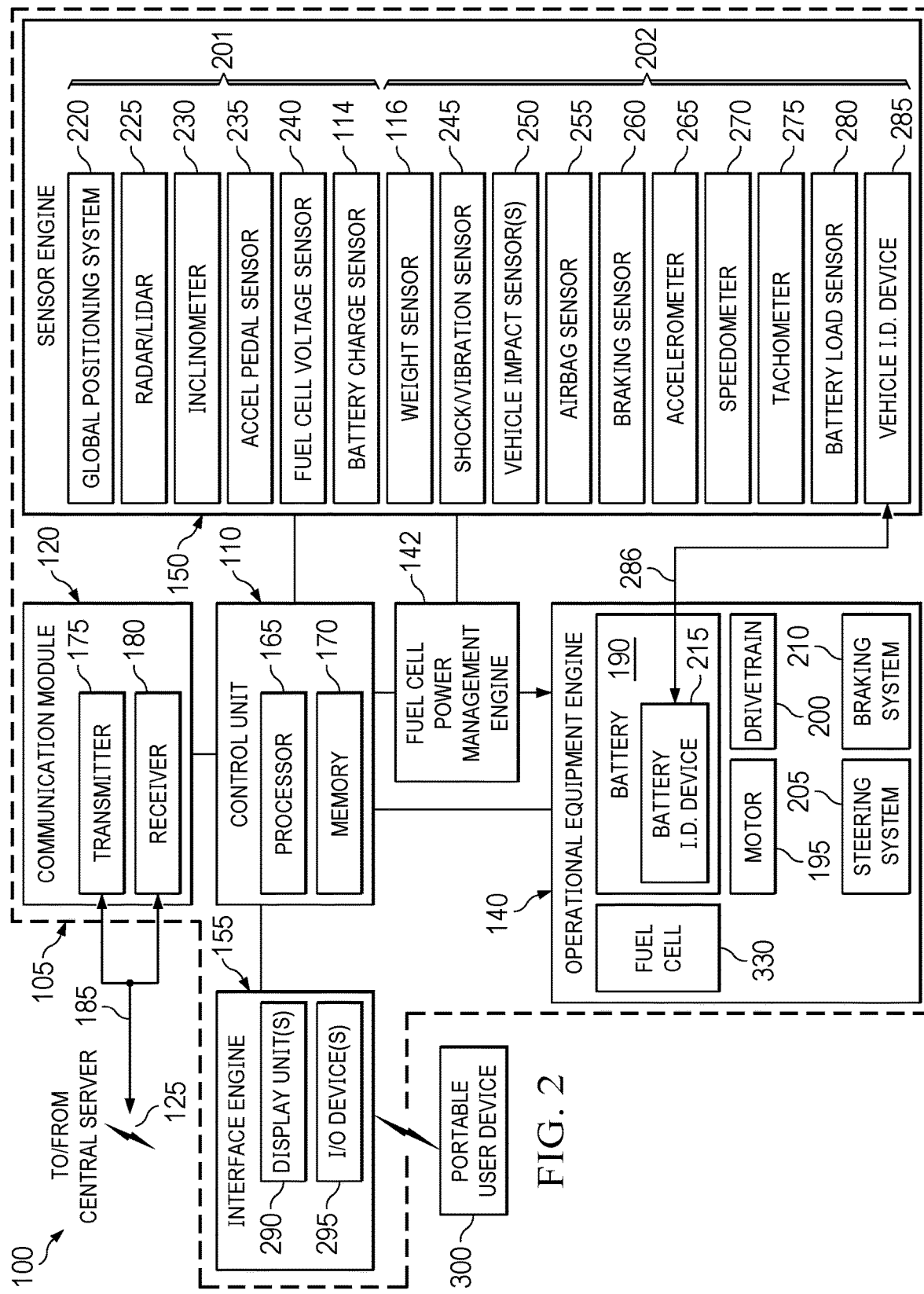
FIG. 2 is an illustration, in a block-diagram form, of at least a portion of the fuel cell power management system of FIG. 1, in accordance with at least one embodiment of the present disclosure.

FIG. 2 is an illustration, in a block-diagram form, of at least a portion of the fuel cell power management system 100 of FIG. 1, in accordance with at least one embodiment of the present disclosure. It is noted that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a fuel cell 330, vehicle battery 190, a motor 195, a drivetrain or transmission 200, a steering system 205, and a braking system 210. In some vehicles, the fuel cell 330 and/or vehicle battery 190 may provide electrical power to the motor 195 to drive the wheels 115e of the vehicle 105 via the drivetrain 200. In some examples, instead of or in addition to providing power to the motor 195 to drive the wheels 115e of the vehicle 105 via the drivetrain or transmission 200, the fuel cell 330 and/or vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

In some examples, the sensor engine 150, which is operably coupled to, and adapted to be in communication with, the vehicle control unit 110, includes devices such as sensors, meters, detectors, or other devices configured to measure or sense a parameter related to a driving operation of the vehicle 105. For example, the sensor engine 150 may include a global positioning system (GPS) or other positioning sensor 220 (e.g., GLONASS, Galileo, LORAN, WiFi triangulation, radio broadcast tower triangulation, or cell tower triangulation system, etc.), RADAR or LIDAR sensor 225, accelerator pedal deflection sensors 235, a fuel cell voltage sensor 240, a shock/vibration sensor 245, a vehicle impact sensor 250, an airbag sensor 255, a braking sensor 260, an accelerometer or acceleration sensor 265, a speedometer 270, a tachometer 275, a battery load sensor 280, a vehicle identification device 285, a battery charge sensor 114, a weight sensor 116, or any combinations thereof. The sensors or other detection devices may be configured to sense or detect activity, conditions, and circumstances in an area to which the device has access, e.g., conditions inside or outside the vehicle cabin. Sub-components of the sensor engine 150 may be deployed at any operational area where information on the driving of the vehicle 105 may occur. Readings from the sensor engine 150 are fed back to the vehicle control unit 110, brake ECU 112, power train ECU or hybrid ECU 113, and/or fuel cell power management engine 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110 or brake ECU 112. The accelerometer 265 is adapted to monitor acceleration of the vehicle 105 and to communicate the acceleration information to the vehicle control unit 110, hybrid ECU/power train ECU 113, or fuel cell power management engine 142. The accelerometer 265 may be, for example, a two-axis accelerometer 265 or a three-axis accelerometer 265. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 and/or battery charge sensor 114 are adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 may be adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 290 may refer to one, or any combination, of the display units. The I/O device 295 may be, include, or be part of a communication port (e.g., a USB port), a Bluetooth communication interface, a tough-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

In some examples, a portable user device 300 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device (e.g., a smartphone or tablet computer) which is carried onto the vehicle 105 by a user who is a driver or a passenger on the vehicle 105, or proximate to the vehicle. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated. In other examples, the portable device is, or can serve as, an electronic key fob.

The fuel cell power management system 100 also includes a fuel cell power management engine 142, the operation of which will be described below. In some embodiments, the fuel cell power management engine 142 comprises a stand-alone housing with its own processor and memory. In other embodiments, the fuel cell power management engine 142 exists as software, firmware, or hardware within another processor, such as the vehicle control unit 110, operational equipment engine 140, brake ECU 112, or power train ECU/hybrid ECU 113. The sensor engine 150 includes environmental sensors 201 and vehicle sensors 202.

It is understood that other components or arrangements of components may be found in a vehicle 105, and that the same general principles apply to electric vehicles, internal combustion vehicles, and hybrid vehicles.

Figure 3:
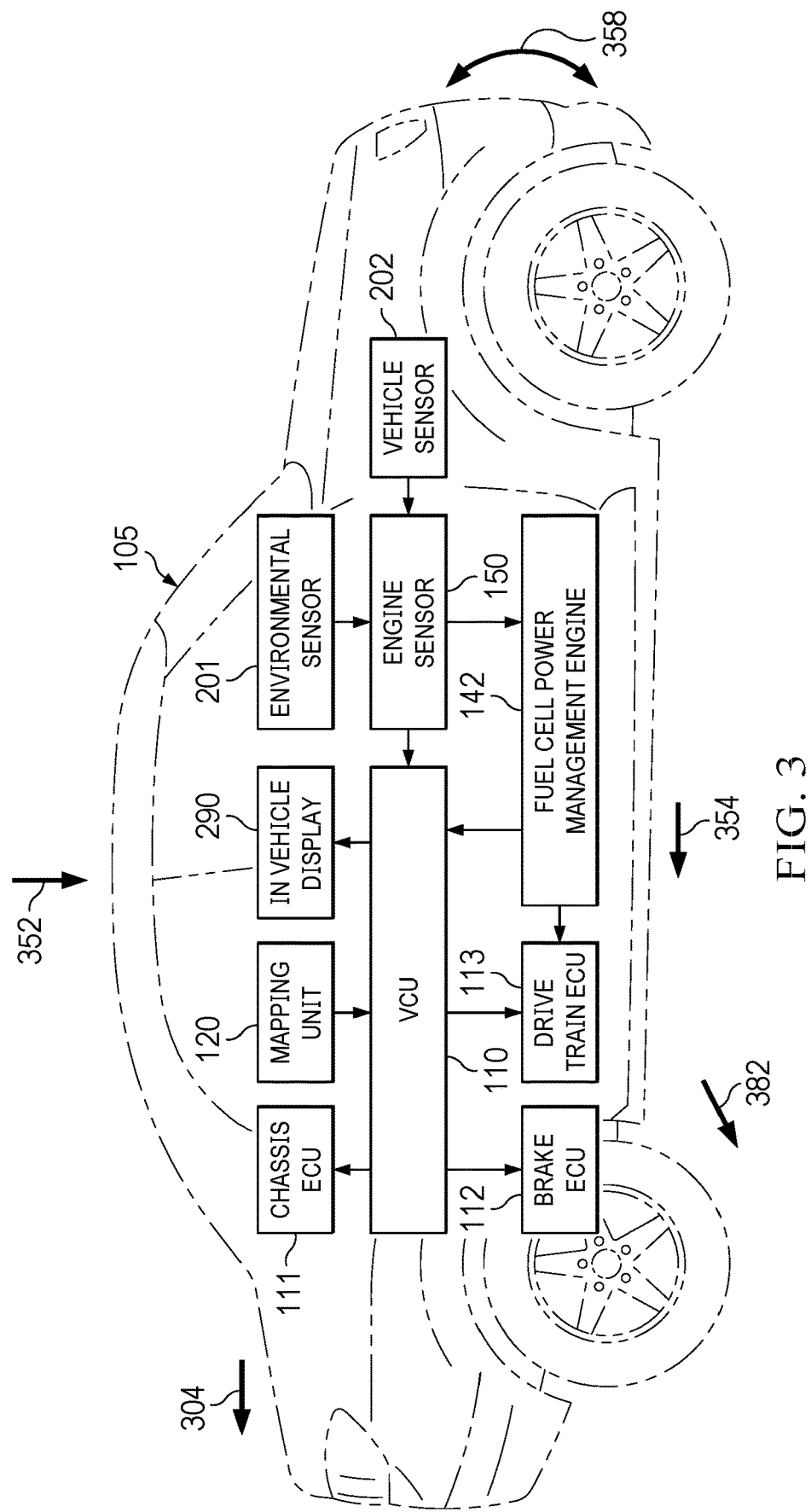
FIG. 3 is an exemplary diagrammatic illustration of at least a portion of the fuel cell power management system, embodied as a vehicle, in accordance with at least one embodiment of the present disclosure.

FIG. 3 is an exemplary diagrammatic illustration of at least a portion of the fuel cell power management system 100 embodied as a vehicle 105 in accordance with at least one embodiment of the present disclosure. In this implementation, for clarity, only certain engines, systems, and components are shown. However, other engines, systems, and components, including those describe herein, are also contemplated as being a part of the fuel cell power management system 100 shown in FIG. 3. In this example, within the vehicle 105 the VCU 110 receives information from a sensor engine 150, which receives information from environmental sensors 201 and vehicle sensors 202. In addition, the VCU 110 sends information to the chassis ECU 111, brake ECU 112, power train ECU 113, and in-vehicle display 290.

Force variables that may be incorporated into physics calculations within the VCU 110 (or other processor within the vehicle) include but are not limited to the vehicle absolute weight 352, vehicle rolling friction 354, vehicle aerodynamic drag 304, and vehicle pitch 358. In some examples, each of these variables is a force that may be expressed in lbf, Newtons, or any other unit of force as desired. In an example, the vehicle pitch 358 is stored within the memory 170 of the vehicle control unit 110, and is calculated based on data from the accelerometer 265 to provide a sensed acceleration, and the first derivative of the vehicle speed from the speedometer 270 to provide an acceleration value tangent to the road surface. The difference between these two acceleration vectors indicates vehicle pitch 358. Vehicle pitch may also be measured with an inclinometer or geomagnetometer.

Other variables may not be directly known, but may be estimated from graphs, curves, or lookup tables for a nominal vehicle (e.g., vehicle weight 352, vehicle rolling friction 354, and vehicle aerodynamic drag 304). Some variables may be calculated or estimated from performance variables that normally exist within the VCU 110. For example, the combined mass, gross weight, or inertia of the vehicle 105 may be determined from the acceleration profile of the vehicle given a known force imparted by the motor 195 and drivetrain 200, and the Newtonian relationship F=ma. The mass of the carried load may then be estimated by subtracting a nominal or expected vehicle mass (e.g., stock weight or stock mass). Alternatively, if the road grade is known (e.g., from GPS data), the combined vehicle and carried load mass may be estimated based on the work or energy required for the operational equipment engine to push the vehicle uphill, or the force required hold it from rolling backward.

The total drag on the vehicle can be calculated based on the power output required to maintain a particular vehicle speed, and the sum of nominal or estimated values of the vehicle rolling friction 354 and aerodynamic drag 304. The ratio of aerodynamic drag to rolling friction can be estimated from known relationships for typical vehicles, or by other methods. The grade of the road or ground surface under the vehicle may be calculated from accelerometers, or may be calculated or taken directly from stored maps, GPS data or other indicators. The combination of vehicle weight 352, vehicle aerodynamic drag 304, and vehicle rolling friction 354 can be used to compute a vehicle road load vector 382 (e.g., as a vector sum of the force vectors). Histories, time averages, first derivatives, integrals, or filters of any of the aforementioned variables, along with known, anticipated, or estimated future values for some or all of the variables may also be incorporated into the physics calculations to improve or refine the results of the calculations. Accelerator pedal position may also be incorporated as being proportional to an expected power output from the motor 195.

The fuel cell power management system 100 also includes a fuel cell power management engine 142, which accepts inputs from the sensor engine (e.g., inputs from the global positioning system 220, inclinometer 230, RADAR/LIDAR 225, battery charge sensor 114, accelerator pedal sensor 235, fuel cell voltage sensor 240, and/or weight sensor 116 of FIG. 2) and provides outputs, for example, to the VCU 110 or power train ECU 113.

Figure 4:
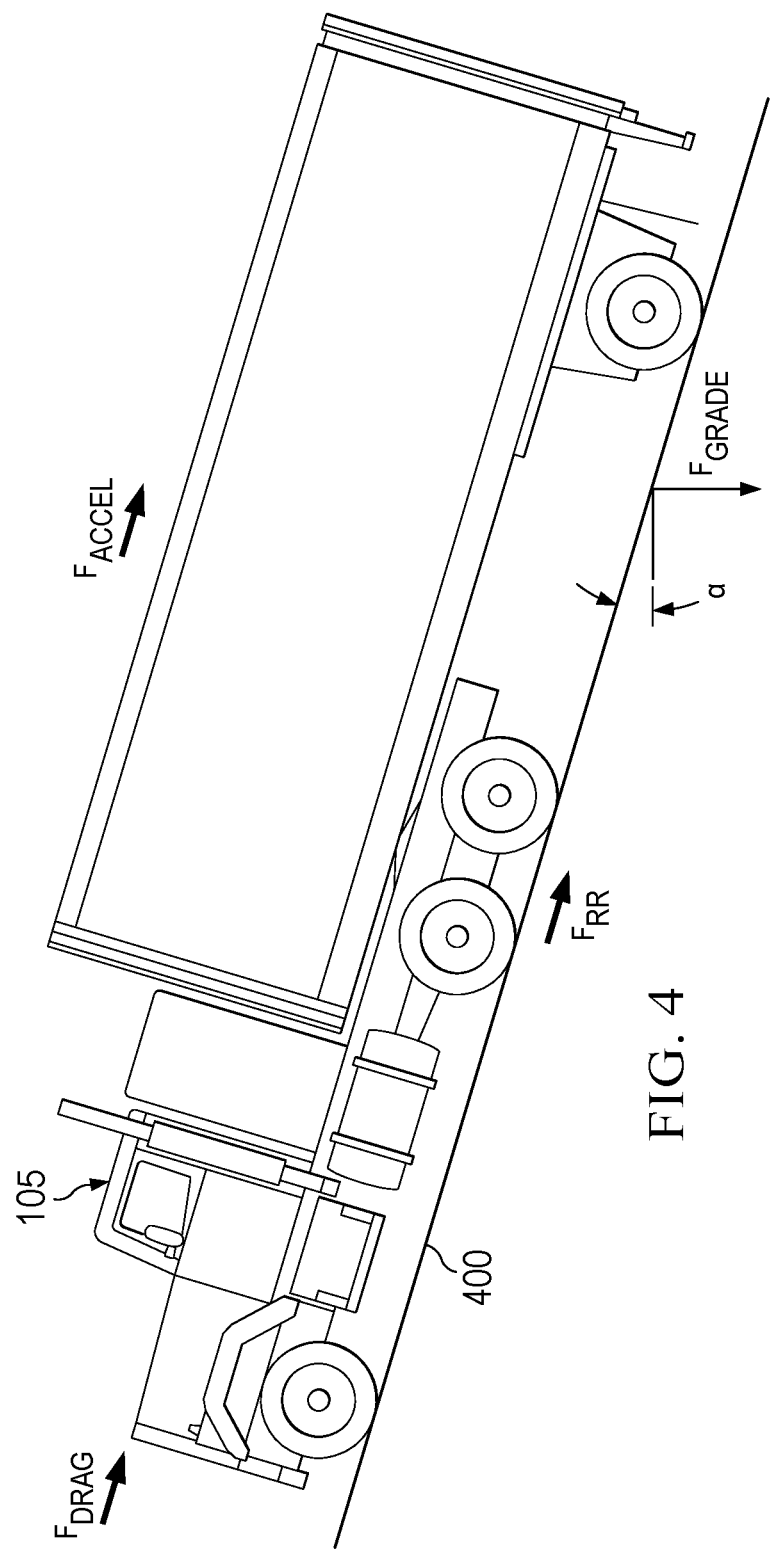
FIG. 4 is a schematic, diagrammatic view of a vehicle traveling on a road surface, in accordance with at least one embodiment of the present disclosure.

FIG. 4 is a schematic, diagrammatic view of a vehicle 105 traveling on a road surface 400 of road grade α, in accordance with at least one embodiment of the present disclosure. The vehicle 105 is acted on by forces $F_{Drag}$, $F_{accel}$, $F_{RR}$, and $F_{Grade}$. Using the following definitions:

$F_{Drag}$=force due to air resistance
$F_{RR}$=force due to rolling resistance and drivetrain friction losses
$F_{Grade}$=force due to gravity and road grade
$F_{Accel}$=force due to acceleration
$F_{Motor}$=force due to the motor(s)
$C_d$=coefficient of drag (nondimensional)
$A_{front}$=vehicle frontal area (m$^2$)
$\rho_{air}$=density of air (kg/m$^3$)
a=vehicle acceleration (m/s$^2$)
$m_v$=vehicle mass (kg)
G=gravitational acceleration (m/s$^2$)
$\mu_{RR}$=road friction coefficient (nondimensional)
α=road grade (degrees)
$V_{air}$=air velocity (m/s, related to but not identical to vehicle speed)

The following physical relationships between the various parameters and forces can be determined:

$$a = \frac{F_{Motor} - F_{Road\,Load}}{m_v} \qquad \text{EQN. 1}$$

$$F_{Accel} = m_v * a \qquad \text{EQN. 2}$$

$$F_{total} = F_{Road\,Load} + F_{Accel} \qquad \text{EQN. 3}$$

$$F_{Road\,Load} = F_{Drag} + F_{RR} + F_{Grade} \qquad \text{EQN. 4}$$

$$F_{Drag} = \frac{1}{2} C_d * A_{front} * \rho_{air} * V_{air}^2 \qquad \text{EQN. 5}$$

$$F_{RR} = m_v * G * \mu_{RR} \qquad \text{EQN. 5}$$

$$F_{Grade} = m_v * G * \sin(\alpha) \qquad \text{EQN. 6}$$

The total energy required to complete a drive cycle is a function of the road load forces and the acceleration force. The forces can be categorized into conservative and non-conservative forces. Road load forces ($F_{Drag}$, $F_{RR}$, $F_{Grade}$, etc.) are slow-response, low-transient, non-conservative forces (e.g., functions of the vehicle and environment), whereas acceleration forces ($F_{Accel}$, $F_{Motor}$) are fast-response, high-transient forces, conservative forces (e.g., a function of driver demand).

It is an object of the present disclosure to minimize fuel cell degradation by adjusting the fuel cell power output to compensate primarily for the road load forces, and the battery power output to meet transient acceleration demands.

Figure 5:
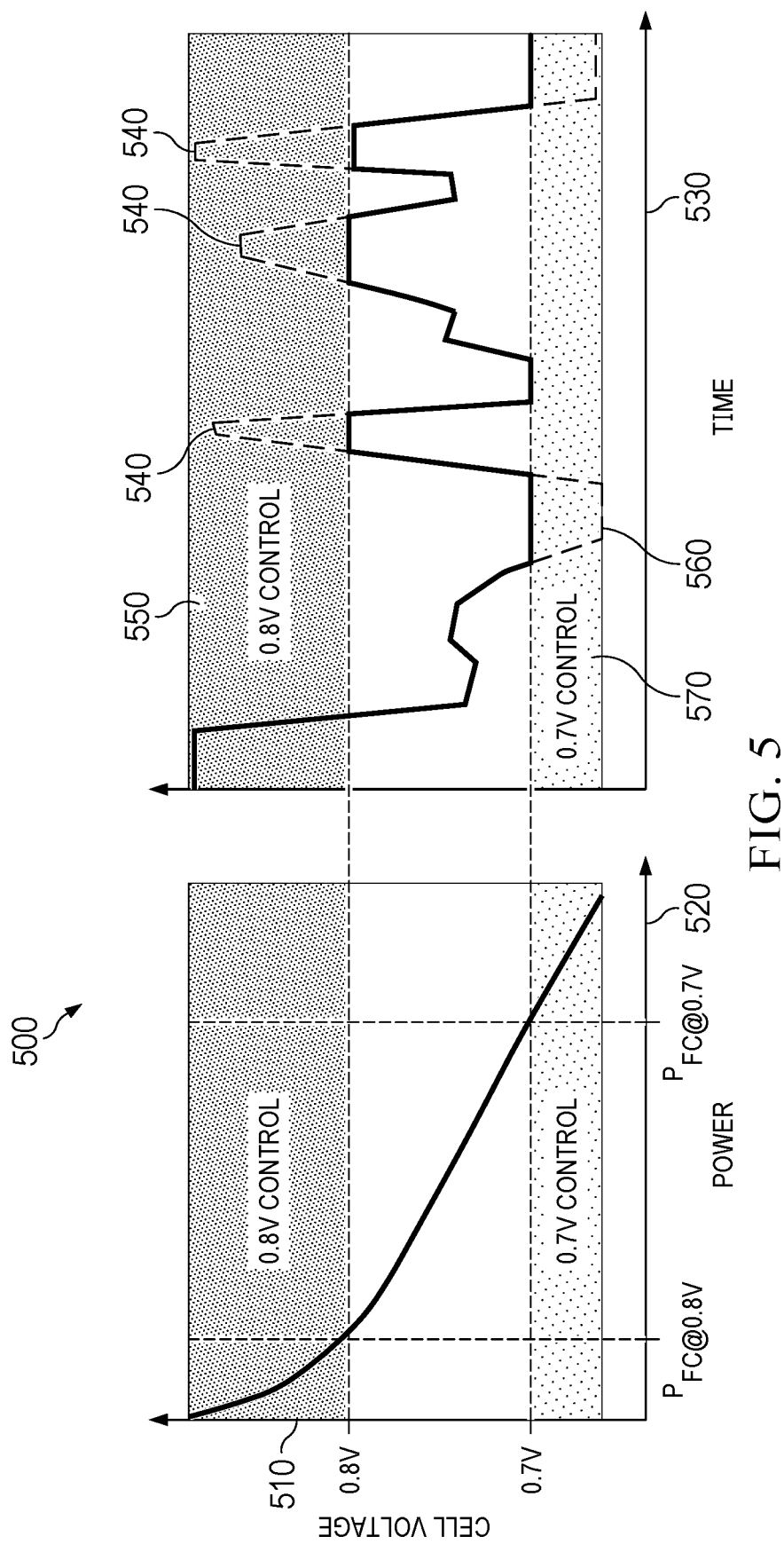
FIG. 5 is a graph of fuel cell voltage as a function of power and time, in accordance with at least one embodiment of the present disclosure.

FIG. 5 is a graph 500 of fuel cell voltage 510 as a function of power 520 and time 530, in accordance with at least one embodiment of the present disclosure. As can be seen in the graph, the power output 520 of the fuel cell 330 is inversely proportional to the voltage 510, such that the power output 520 is close to zero at a cell voltage of 0.9 volts. At a voltage of 0.8 V, the power output 520 has a nonzero value of $P_{FC@0.8V}$, and at a voltage of 0.7 V, the power output 520 has a larger nonzero value of $P_{FC@0.7V}$. Even higher power outputs are possible at fuel cell voltages of less than 0.7 Volts.

However, the condition of the fuel cell 330 (see FIG. 2) can be degraded by operation above 0.8 Volts or below 0.7 Volts. It is therefore an object of the present disclosure to prevent or limit the occurrence of such high and low fuel cell voltages by supplementing fuel cell voltage with voltage from the vehicle battery, in order to keep the fuel cell voltage between 0.7V and 0.8V.

Thus, the graph 500 of cell voltage 510 vs. time 530 shows clipped regions 540 within an 0.8 V control region 550, wherein power from the battery 190 is used to supplement the insufficient power output of the fuel cell 330 (see FIG. 2), to keep the fuel cell voltage 510 from exceeding 0.8 V. The graph 500 of cell voltage 510 vs. time 530 also shows clipped regions 560 in an 0.7 V control region 570, wherein power from the battery 190 is used in place of available power from the fuel cell 330, to keep the fuel cell voltage 510 from falling below 0.7 V. Thus, this arrangement advantageously minimizes fuel cell degradation that might otherwise occur due to overvoltage or undervoltage conditions.

Figure 6:
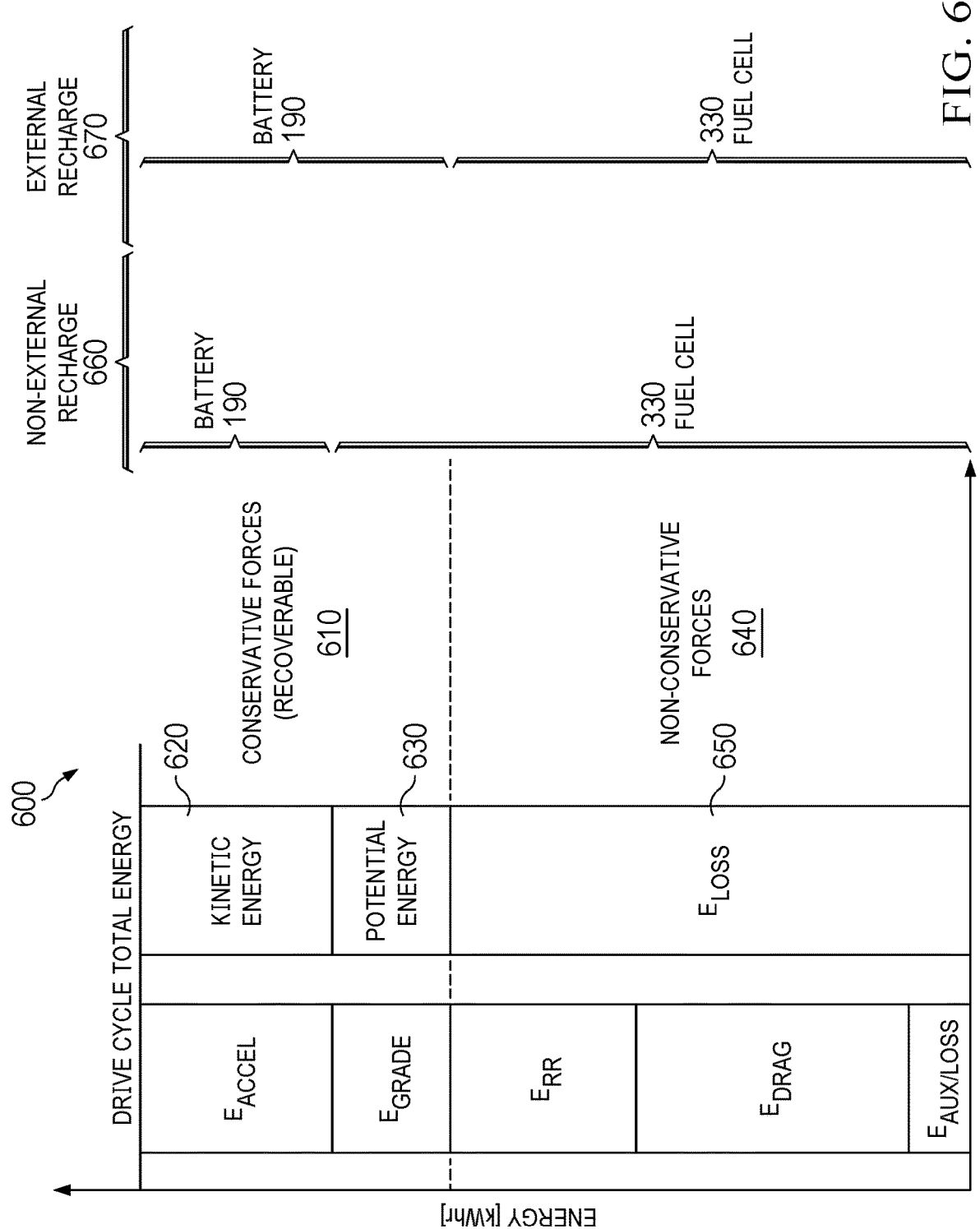
FIG. 6 is a graphical representation of the energy requirements associated with different forces, in accordance with at least one embodiment of the present disclosure.

However, the graph 500 of cell voltage 510 vs. time 530 shows significant transient changes of the fuel cell voltage in between the 0.8 V and 0.7 V thresholds. The condition of the fuel cell 330 can also be degraded by such rapid and/or large magnitude cell voltage fluctuations in between 0.8 and 0.7 volts. It is therefore an object of the present disclosure to split such power requests between the vehicle battery (a fast-response, high-transient-power device) and the fuel cell stack (a slow-response, low-transient power device), In other words, power requirements that change slowly may be handled largely by the fuel cell, whereas power requirements that change quickly may be more properly handled by the vehicle battery, in order to keep the fuel cell voltage between 0.7 and 0.8V FIG. 6 is a graphical representation 600 of the energy requirements associated with different forces, in accordance with at least one embodiment of the present disclosure. The energy associated with conservative/recoverable forces includes kinetic energy 620 (e.g., the energy associated with vehicle acceleration) and potential energy 630 (e.g., the energy associated with the vehicle moving up and down various road grades). The energy associated with non-conservative/non-recoverable forces 640 include energy losses 650 due to rolling resistance, aerodynamic drag, and other losses.

In a first example 660, the fuel cell power management system does not include an external charger for charging the vehicle battery. In this example 660, the fuel cell 330 handles not only the energy losses 650 associated with non-conservative forces, but also the recoverable potential energy 630 associated with gravity and road grade, on the basis that the demand for potential energy 630 (e.g., the energy required to climb a hill) changes slowly, and can therefor be met by the fuel cell without incurring large or rapid changes in power demand. The demand for kinetic energy 620 (e.g., to accelerate the vehicle) is met by the battery 190, on the basis that the demand for kinetic energy 620 can change rapidly, resulting in large, transient power demands that have the potential to degrade the performance of the fuel cell 330, if the fuel cell 330 were used to meet the kinetic energy demand. This arrangement advantageously minimizes transient loads on the fuel cell 330 and thus minimizes fuel cell degradation that might otherwise be caused by such transient loads.

The traditional hybrid vehicle battery can only recover energy by the on-board main power unit (ex: motor or fuel cell) or regenerative braking. The power management control is targeting to keep the same HV battery SOC at the beginning and ending of a drive.

In a second example 670, the fuel cell power management system includes an external charger for charging the vehicle battery. In this example 670, the demand for potential energy 630 is met by the battery rather than by the fuel cell, because the power management control can allow the HV battery SOC at the end of a route to be lower than the beginning since the HV battery can be charged by an external power source. This arrangement advantageously overcomes the problems faced by a traditional hybrid vehicle battery. If the HV battery has external recharge capability, the total route energy usage can be optimized by allowing more HV battery energy to be used since the HV battery can be recharged by and external power supply at the end of the route.

Figure 7:
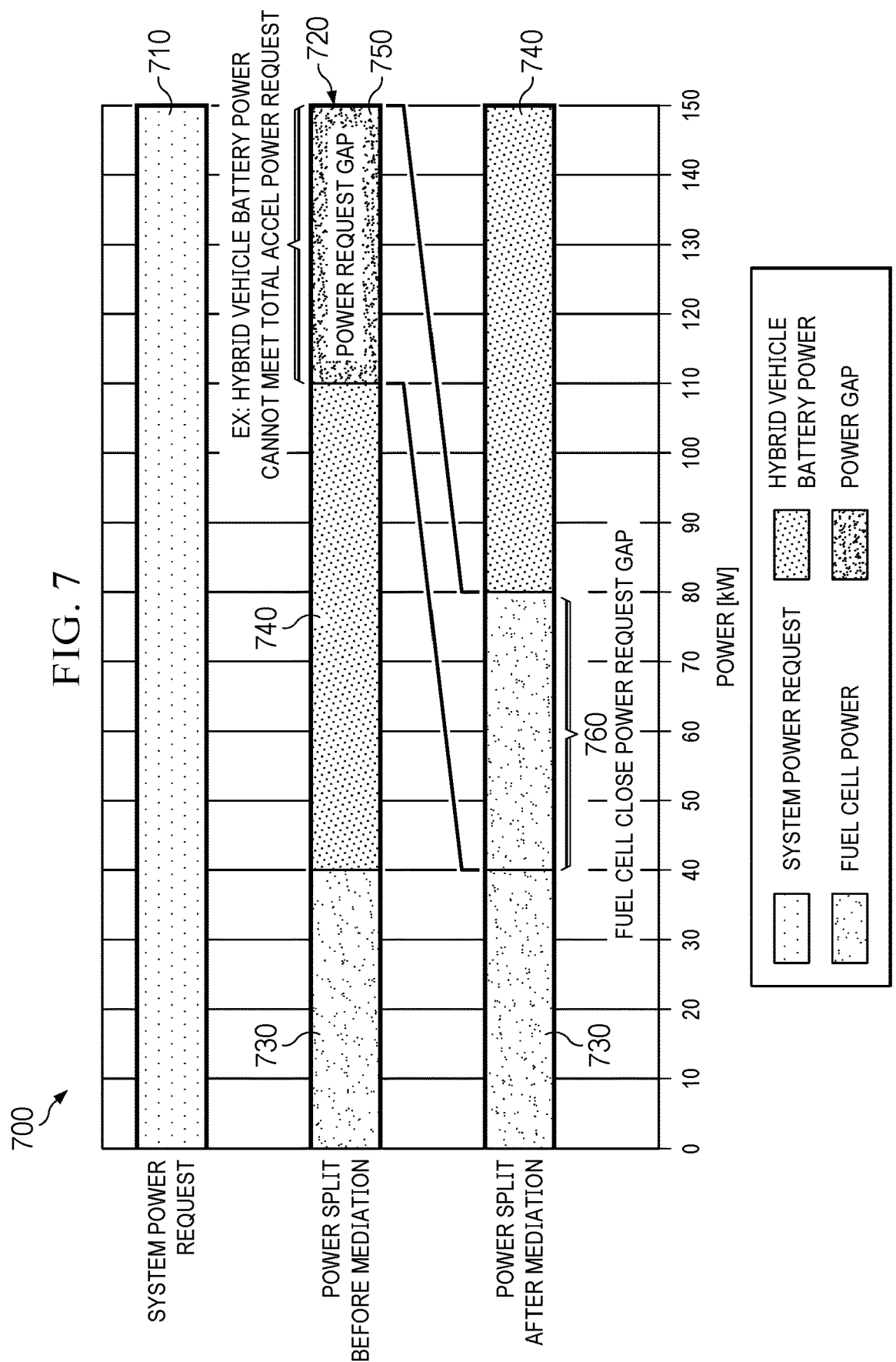
FIG. 7 is a graphical representation of a power split mediation process, in accordance with at least one embodiment of the present disclosure.

FIG. 7 is a graphical representation 700 of a power split mediation process, in accordance with at least one embodiment of the present disclosure. In the example shown in FIG. 7, a system power request 710 (e.g., the total power required to overcome losses, climb grades, and meet acceleration demands identified by the accelerator pedal position) is received by the fuel cell power management system. In an initial power split 720, fuel cell power output 730 is set to a high value such as $P_{FC@0.7V}$, e.g., the maximum power the fuel cell can deliver without going below 0.7 V. Similarly, the battery power output is set to its maximum value, $P_{BatteryMax}$. However, the sum of $P_{FC@0.7V}$ and $P_{BatteryMax}$ is less than the system power request 710, resulting in a power request gap 750. In other words, the combined power output of the fuel cell and battery are insufficient to meet the system power request 710.

Under these conditions, the fuel cell power management system may increase the power output of the fuel cell by an amount 760 that is equal to the power request gap 750. Depending on the implementation, this fuel cell power increase 760 may occur even if the resulting fuel cell voltage is driven below 0.7 V, in order to give precedence to (for example) driver inputs vs. the mitigation of gradual fuel cell degradation over time. This condition may be expected to occur during a small minority of total driving time. Thus, the fuel cell power management system advantageously minimizes fuel cell degradation without compromising the responsiveness of the vehicle to driver inputs such as increasing the deflection of the accelerator pedal. In other embodiments, depending on the implementation, the fuel cell power management system may optionally give precedence to protecting the fuel call from degradation rather than ensuring the responsiveness of the vehicle. Such precedence may for example be selectable via a user control.

Figure 8:
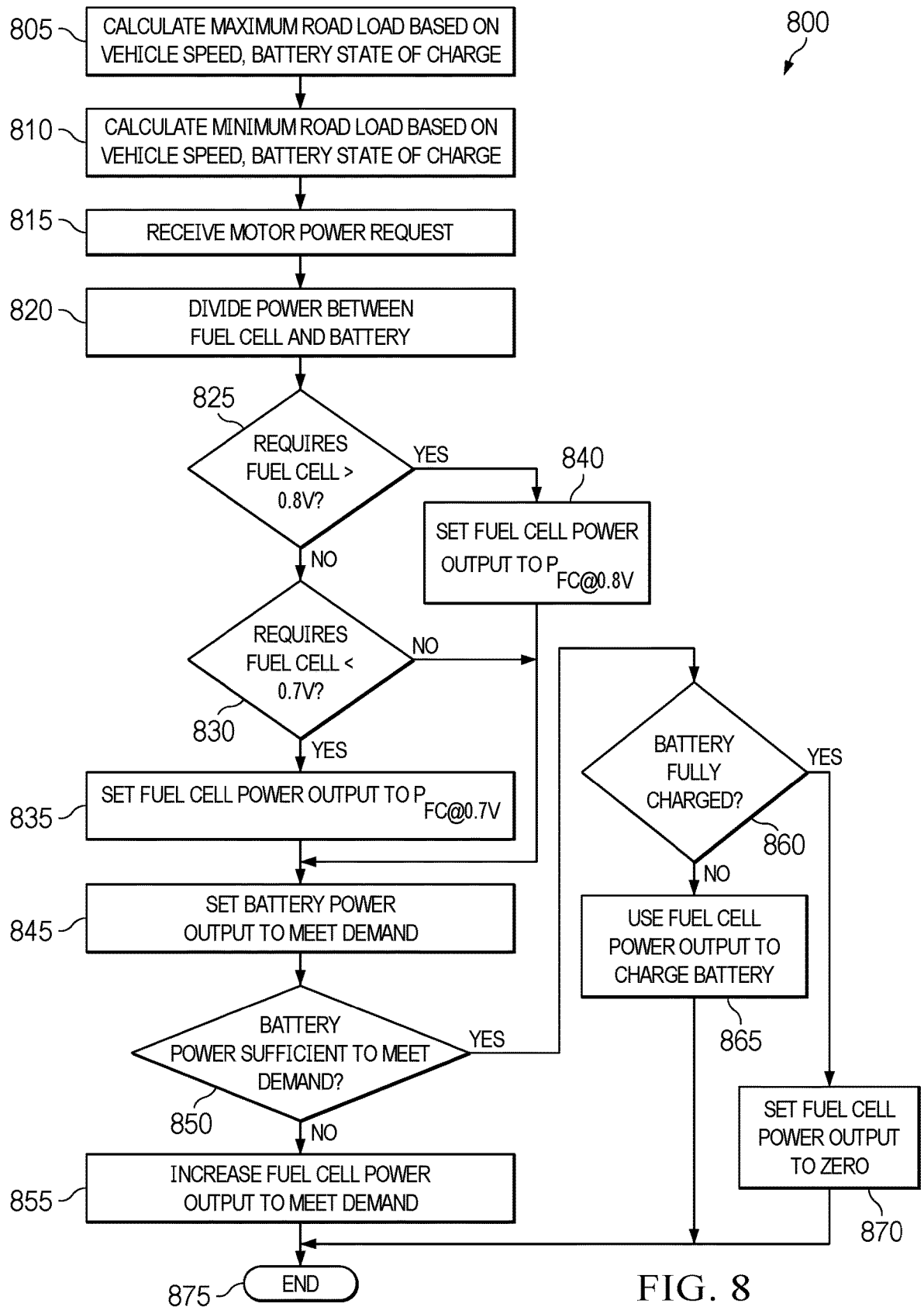
FIG. 8 is a schematic, diagrammatic representation, in flow diagram form, of an example fuel cell power management method, in accordance with at least one embodiment of the present disclosure.

FIG. 8 is a schematic, diagrammatic representation, in flow diagram form, of an example fuel cell power management method 800, in accordance with at least one embodiment of the present disclosure. It is understood that the steps of method 800 may be performed in a different order than shown in FIG. 8, additional steps can be provided before, during, and after the steps, and/or some of the steps described can be replaced or eliminated in other embodiments. One or more of steps of the method 800 can be carried by one or more devices and/or systems described herein, such as components of the fuel cell power management system 100, VCU 110, power train ECU 113, and/or processor circuit 1450.

In step 805, the method 800 includes calculating the maximum plausible road load based on the vehicle speed V, the battery state of charge SOC, and maximum plausible values for all uncertain variables. Execution then proceeds to step 810.

In step 810, the method 800 includes calculating the minimum plausible road load based on the vehicle speed V, the battery state of charge SOC, and minimum plausible values for all uncertain variables. Execution then proceeds to step 815.

In step 815, the method 800 includes receiving a motor power request. This is the power required to overcome road load forces and provide the requested acceleration. Execution then proceeds to step 820.

In step 820, the method 800 includes dividing the motor power request between the fuel cell and battery, by assigning the power to overcome road load to the fuel cell, and the power required to accelerate to the battery. Execution then proceeds to step 825.

In step 825, the method 800 includes determining whether the power division of step 820 requires a fuel cell voltage greater than 0.8 V. If yes, execution proceeds to step 840. If no, execution proceeds to step 830.

In step 830, the method 800 includes determining whether the power division of step 820 requires a fuel cell voltage less than 0.7 V. If yes, execution proceeds to step 835. If no, execution proceeds to step 845.

In step 835, the method 800 includes setting the fuel cell power to $P_{FC@0.7V}$, such that the fuel cell voltage does not fall below 0.7 V. Execution then proceeds to step 845.

In step 840, the method 800 includes setting the fuel cell power output to $P_{FC@0.8V}$ to prevent the fuel cell voltage from exceeding 0.8 V. Execution then proceeds to step 845.

In step 845, the method 800 includes, based on the current value of the fuel cell voltage (which may have been adjusted in steps 835 or 840), setting the battery power output to meet the remaining demand of the motor power request (e.g., motor power request—$P_{FC}$). Execution then proceeds to step 850.

In step 850, the method 800 includes determining whether the battery power output is sufficient to meet the demand of the motor power request. For example, if the battery power output is equal to $P_{BatteryMax}$ and there is still a power request gap (as described above in FIG. 7), then the battery power is insufficient, and execution proceeds to step 855. Conversely, if the battery power output is less than $P_{BatteryMax}$ and/or there is no power request gap, then the battery power is sufficient, and execution proceeds to step 860.

In step 855, the method 800 includes increasing the fuel cell power output to cover the power request gap, even if this will result in a fuel cell voltage below 0.7 V. Execution then proceeds to step 875.

In step 860, the method 800 includes determining whether the battery is fully charged. (In some cases, it may be desirable to keep the fuel cell from charging the battery to 100%, in which case "fully charged" may equate to a SOC of, for example, 75%.) If yes, then execution proceeds to step 870. If no, execution proceeds to step 865.

In step 865, the method 800 includes using at least some of the fuel cell power output to charge the battery. In an example, the fuel cell power output may be set at a level that will fully charge the battery within 30 seconds, 60 second, 600 seconds, etc., without requiring a fuel cell voltage greater than 0.8 V or less than 0.7 V. Execution then proceeds to step 875.

In step 870, the method 800 includes setting the fuel cell power output to zero. Execution then proceeds to step 875.

In step 875, the method is now complete.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, the desired power outputs of the fuel cell and battery may be computed with a frequency of at least 10 Hz and preferably at least 100 Hz, in order to limit the occurrence of overvoltage, undervoltage, or voltage transients that have the potential to degrade the fuel cell, and/or to limit the occurrence of unmet power request gap conditions that have the potential to make the vehicle less responsive to driver inputs. Thus, the fuel cell power management system advantageously minimizes fuel cell degradation without compromising the responsiveness of the vehicle to driver inputs such as increasing the deflection of the accelerator pedal. Depending on the implementation, the steps of the method 800 may be performed by any combination of hardware, software, and/or firmware, without departing from the spirit of the present disclosure.

Figure 9:
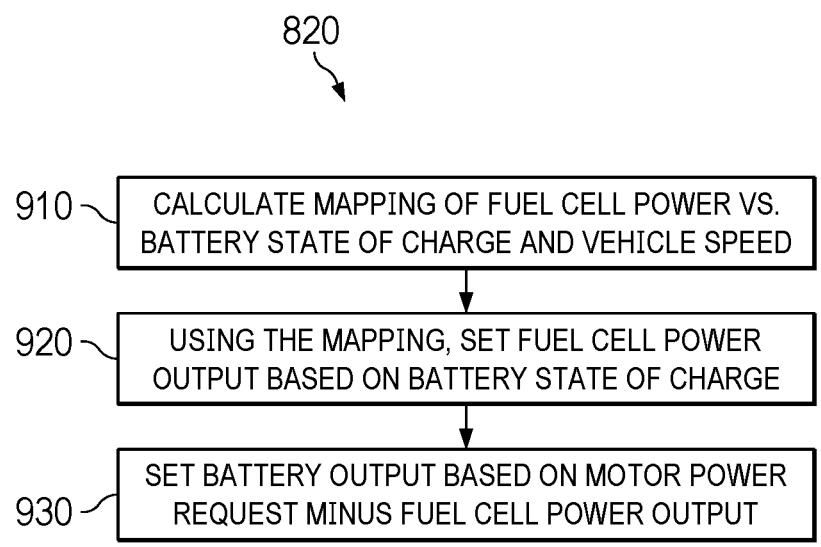
FIG. 9 is a schematic, diagrammatic representation, in flow diagram form, of an example method for dividing power between the fuel cell and battery, in accordance with at least one embodiment of the present disclosure.

FIG. 9 is a schematic, diagrammatic representation, in flow diagram form, of an example method 820 for dividing power between the fuel cell and battery, in accordance with at least one embodiment of the present disclosure.

In step 910, the method 820 includes, using the minimum road load from step 805, the maximum road load from step 810, the vehicle speed, and the battery state of charge SOC, calculating a map of road load power (e.g., the fuel cell traction power output required to overcome road load) as a function of vehicle speed and SOC. Execution then proceeds to step 920.

In step 920, the method 820 includes, using the map and the current values of vehicle speed and SOC, calculating the current road load power and setting the fuel cell traction power output equal to the current road load power. Execution then proceeds to step 930.

In step 930, the method 820 includes setting the battery power output based on the motor power request and the road load power (e.g., $P_{Battery}=P_{MotorRequest}-P_{RoadLoad}$). The method 820 is now complete.

Figure 10:
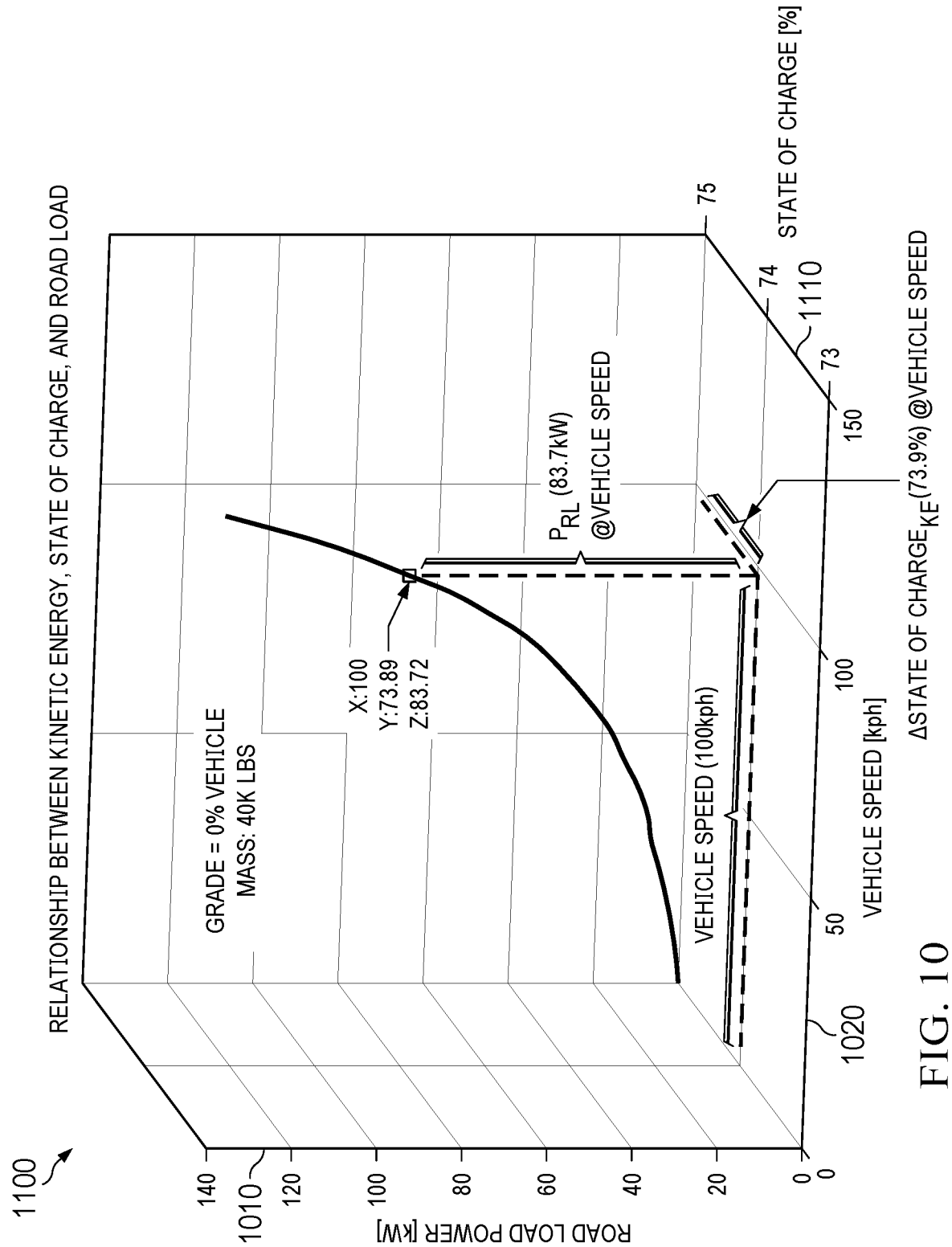
FIG. 10 is a graph relating road load power (e.g., in kilowatts) to vehicle speed (e.g., in kilometers per hour) and vehicle kinetic energy (e.g., in kilowatt-hours), in accordance with at least one embodiment of the present disclosure.

FIG. 10 is an example graph or mapping 1100 relating road load power 1010 (e.g., in kilowatts) to vehicle speed 1020 (e.g., in kilometers per hour) and battery state of charge (SOC) 1110, in accordance with at least one embodiment of the present disclosure. In order to overcome the road load forces, the vehicle must consume energy even when traveling at a constant speed on a level surface. Any energy required to accelerate the vehicle may then be drawn from the vehicle battery. Thus, depletion of the energy stored in the vehicle battery during acceleration can be used as a reasonably accurate measurement of kinetic energy, and therefore (since the vehicle speed can be accurately known from the speedometer) of the vehicle mass. Similarly, since kinetic energy and road load are both functions of the vehicle speed and mass, changes in the battery state of charge at a given speed can be used to compute a more accurate estimate of the minimum and maximum plausible road load, according to the following relationships:

$$P_{RL} = \left(\frac{1}{2} C_d * A_{front} * \rho_{air} * V^2 + \right.$$

$$\left. m_v * G * \mu_{RR} + m_v * G * \sin(\alpha) \right) V * \left(\frac{1}{MG_\eta}\right) \quad \text{EQN. 7}$$

$$KE = \left(\frac{\frac{1}{2} m_v V^2}{3600}\right) \quad \text{EQN. 8}$$

$$\Delta SOC_{KE} = \frac{KE}{Cn} * 100 \quad \text{EQN. 9}$$

where $C_n$ is the battery capacity, and $MG_\eta$ is the drive motor efficiency, and the constant 3600 is for conversion of kilometers per hour into meters per second. Since vehicle mass may be among the largest of the unknown variables in the road load power calculation, the calculation of FIG. 11 may be dramatically more accurate than that shown in FIG. 10. This method also makes the simplifying assumption that the vehicle air speed $V_{air}$ is equal to vehicle ground speed V.

Figure 11:
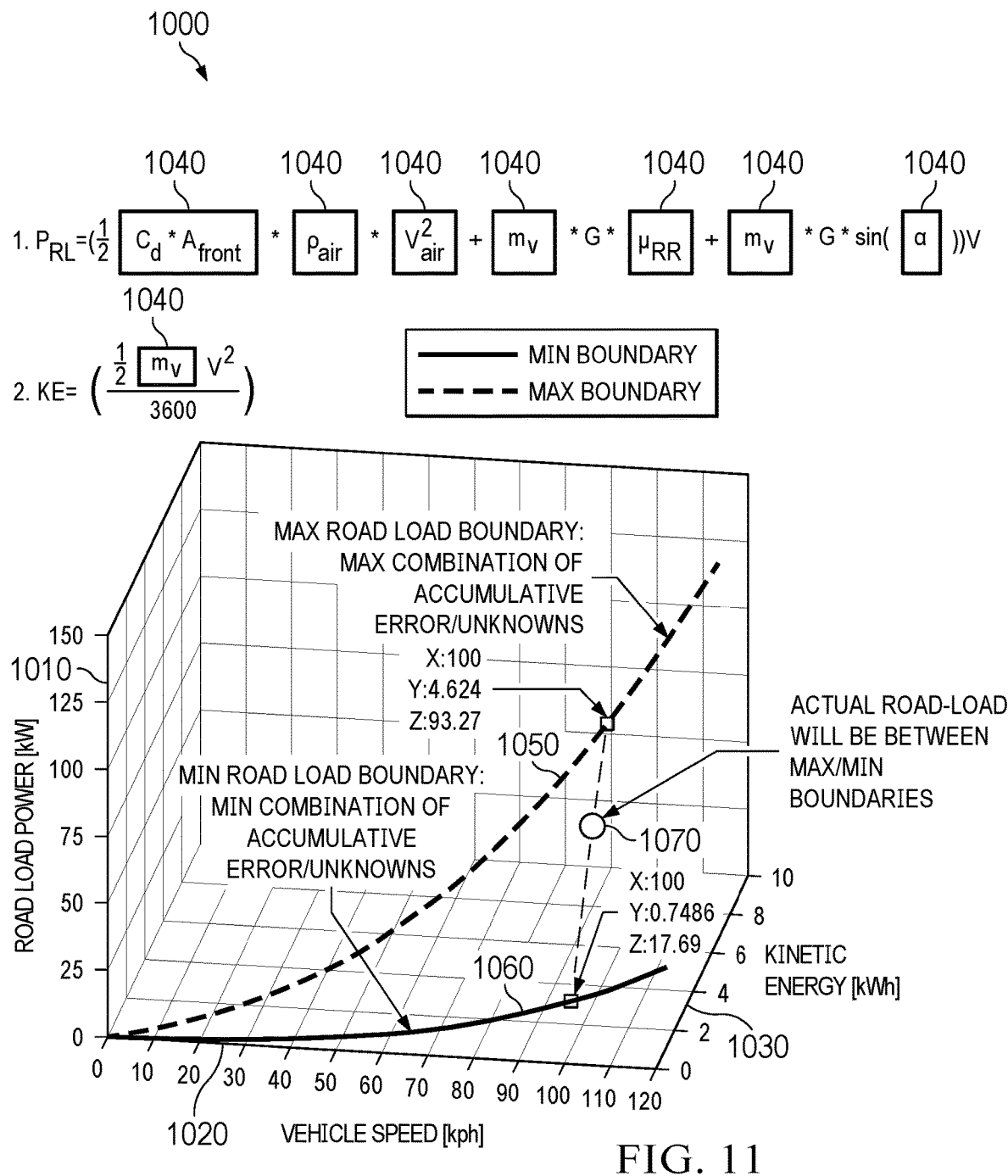
FIG. 11 is an example graph or mapping relating road load power (e.g., in kilowatts) to vehicle speed (e.g., in kilometers per hour) and battery state of charge (SOC), in accordance with at least one embodiment of the present disclosure.

Taking all of the above into account, the example of FIG. 11 shows that for the vehicle traveling at 100 kilometers per hour with a battery SOC of 73.9%, the road load power is approximately 83.72 kilowatts—a fairly precise value that can be used to set the power output of the fuel cell.

For exemplary purposes, FIG. 11 shows, among other things, that the kinetic energy of FIG. 10 can be represented as HV battery SOC through EQN. 9.

FIG. 11 is a graph 1000 relating road load power 1010 (e.g., in kilowatts) to vehicle speed 1020 (e.g., in kilometers per hour) and vehicle kinetic energy (e.g., in kilowatt-hours), in accordance with at least one embodiment of the present disclosure. Because the calculation of road load power 1010 and kinetic energy 1030 each rely on uncertain variables 1040 whose values cannot be precisely known, the possible values of road load power 1010 are bounded by a maximum road load boundary 1050 and a minimum road load boundary 1060. The maximum road load boundary 1050 may for example be computed by supplying the largest plausible values for drag coefficient Ca, vehicle frontal area $A_{front}$, air density $\rho_{air}$, air velocity $V_{air}$, vehicle mass $m_v$, rolling resistance coefficient $\mu_{RR}$, and road grade α, whereas the minimum road load boundary 1060 may for example be computed by supplying the smallest plausible values for these same variables. Maximum and minimum plausible values may for example be a function of vehicle type, vehicle cargo capacity or towing capacity, altitude, plausible weather conditions, maximum legal road grades, etc., and may be stored in a memory and/or computed or estimated on a periodic or continuous basis.

Thus, for a given vehicle speed 1020, the actual real-world value of road load power 1010 will fall at a point 1070 in between the max boundary 1050 and the min boundary 1060. In the example shown in FIG. 10, the vehicle is a truck which may or may not be towing a trailer, and whose trailer may or may not be loaded to its maximum capacity, thus creating a very large uncertainty regarding the vehicle's mass. Thus, actual road load power 1070 for a vehicle speed of 100 kilometers per hour could fall within a range from as little as 17.69 kilowatts to as much as 93.27 kilowatts. Such a broad range makes it difficult to accurately compute or estimate the power output required for the fuel cell in order to overcome the road load forces. Even an average of the high and low values may be significantly different from the actual road load, and a traditional control approach of calculating a road load estimate and battery state of charge (SOC) target (which is a function of kinetic energy (KE)) can thus contain significant error. Feed-forward/feed-back control may therefore force the system to operate at a point that is not the actual road load/KE balance point.

In some embodiments, this uncertainty can be compensated for by converting the road load boundaries 1050 and 1060 to a hybrid vehicle (HV) battery charge map (e.g., fuel cell power vs. battery SOC and vehicle speed. This allows the fuel cell power to increase or decrease as a function of battery SOC until the system balances at the at the actual road load vs KE point. This is shown for example in FIG. 13, below.

Alternatively, it may be desirable to refine the road load power estimate 1010 based on other available quantities than can be precisely measured, or computed from precise measurements. The battery state of charge is such a quantity, as described above in FIG. 10.

Figure 12:
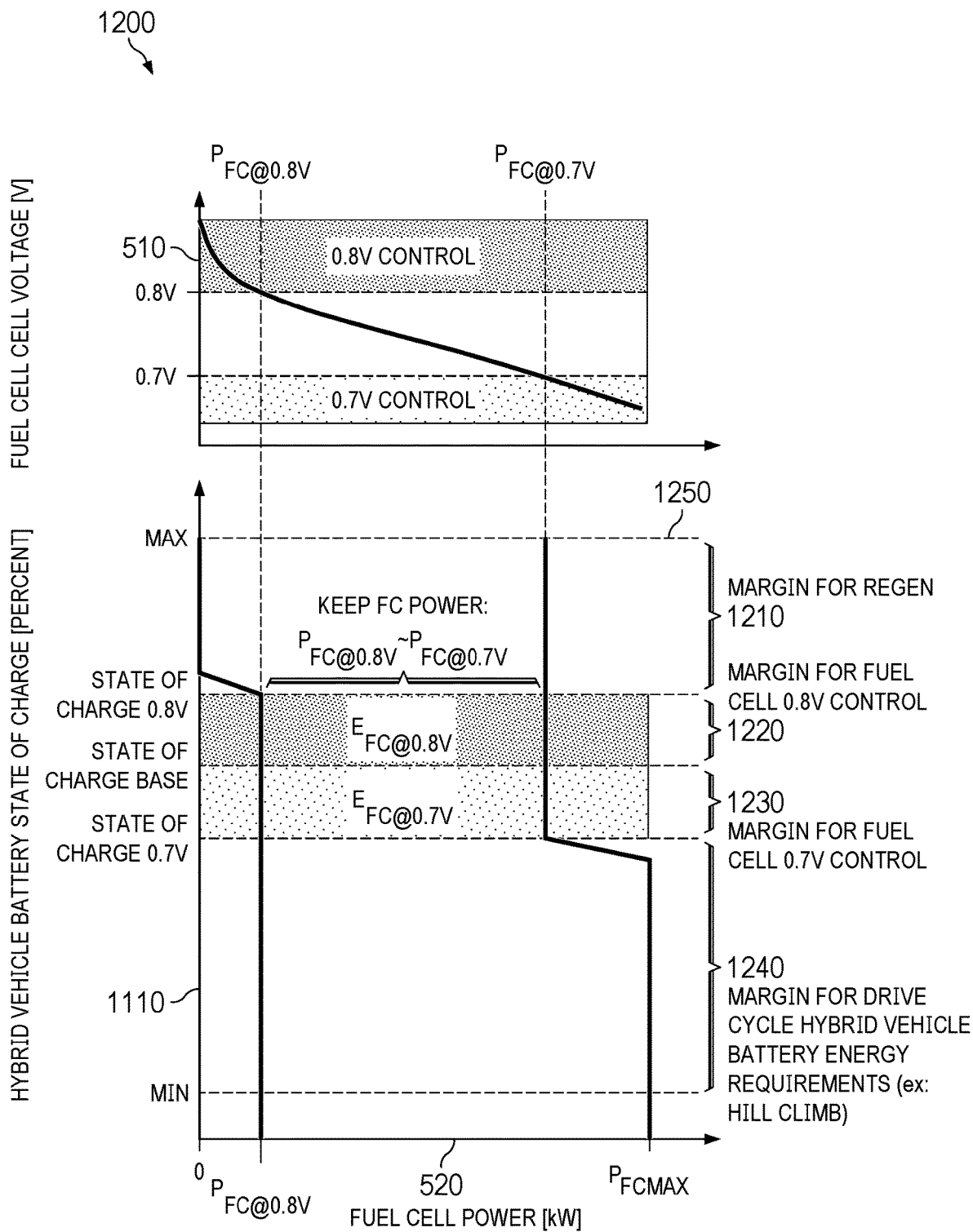
FIG. 12 is a graph showing fuel cell output power as a function of the fuel cell voltage and the hybrid vehicle (HV) battery state of charge (SOC), in accordance with at least one embodiment of the present disclosure.

FIG. 12 is a graph 1200 showing fuel cell output power as a function of the fuel cell voltage and the hybrid vehicle (HV) battery state of charge (SOC), in accordance with at least one embodiment of the present disclosure. Because the battery SOC can be used to compute the road load and therefore the desired power output of the fuel cell, the battery SOC can also be used to control the fuel cell power output in a way that limits the occurrence of overvoltage, undervoltage, and transients. As seen above in FIG. 5, the power output 520 of the fuel cell 330 is inversely proportional to the voltage 510, such that the power output 520 is close to zero at a cell voltage of 0.9 volts. At a voltage of 0.8 V, the power output 520 has a nonzero value of $P_{FC@0.8V}$, and at a voltage of 0.7 V, the power output 520 has a larger nonzero value of $P_{FC@0.7V}$. Even higher power outputs are possible at fuel cell voltages of less than 0.7 Volts. However, in the absence of a power request gap (as shown for example in FIG. 7, above), it is desirable to keep the fuel cell power output 520 in between $P_{FC@0.8V}$ and $P_{FC@0.7V}$, and to minimize large or rapid transients (e.g., spikes or dips) in the power output within this range. In the example shown in FIG. 12, this control is achieved by dividing the fuel cell power response into four different control regions.

In the battery regeneration region 1210, fuel cell voltage is allowed to exceed 0.8 V by up to 0.05 V in order to charge the battery within a specified amount of time (e.g., 30 seconds). This charging may continue until the battery SOC 1110 reaches a maximum level 1250, indicating the battery is fully charged, at which point the fuel cell power output 520 is set to zero.

Figure 13:
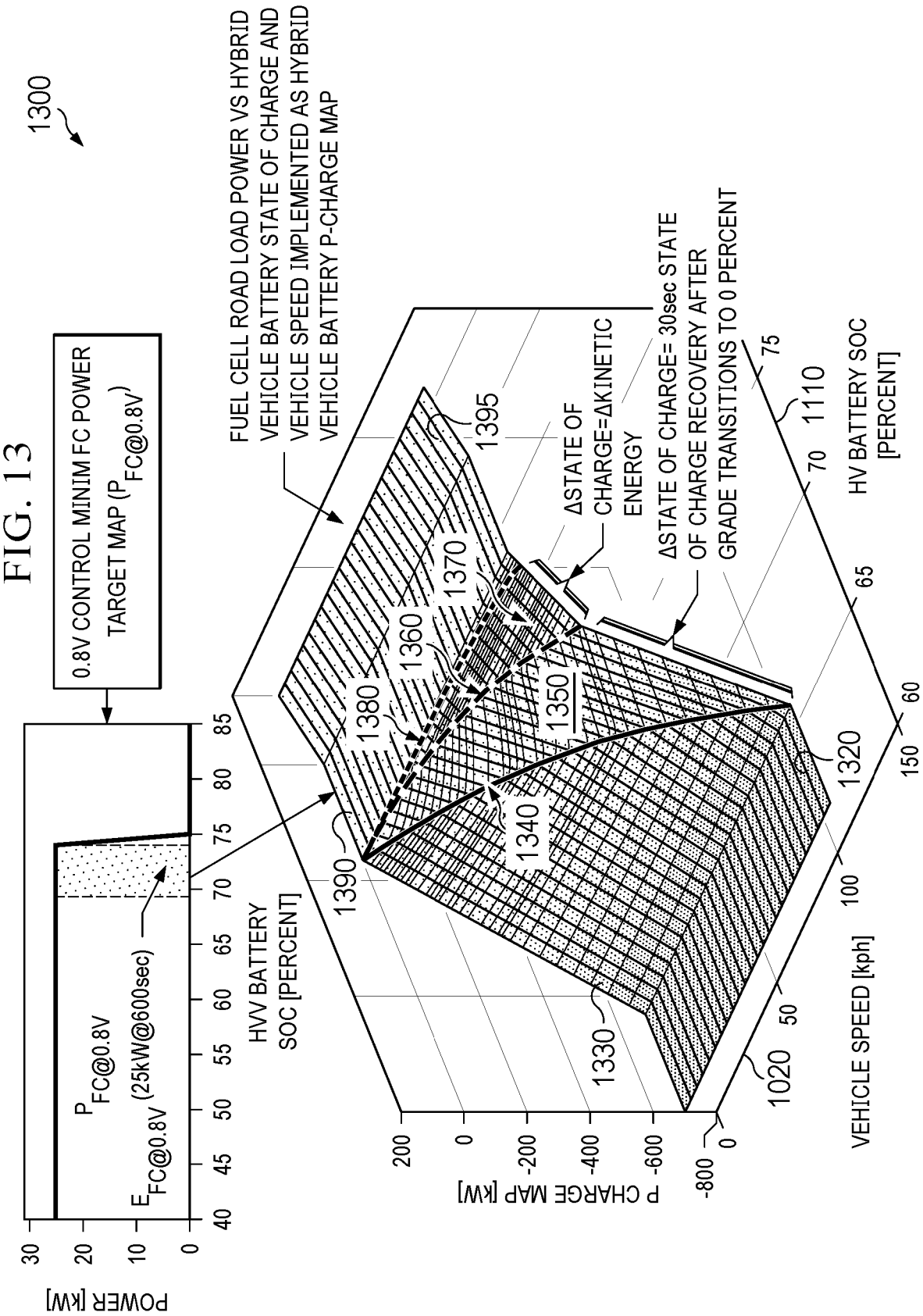
FIG. 13 is an example graph or mapping showing the fuel cell output power (e.g., in kilowatts) required to balance the battery state of charge, in relation to vehicle speed (e.g., in kilometers per hour) and battery state of charge, in accordance with at least one embodiment of the present disclosure.

In the "margin for FC 0.8 V control" region 1220, control is governed by the following equations:

$$P_{FC@0.8V}[kW] = \text{MAP}(SOC_{HV\,Batt}) \quad \text{EQN. 10}$$

$$P_{FC\,req}[kW] = \max(P_{FC\,tgt}, P_{FC@0.8V}) \quad \text{EQN. 11}$$

$$E_{FC@0.8V}[kWh] = FCP_{@0.8V} * \frac{t_{FC@0.8V}}{3600} \quad \text{EQN. 12}$$

$$\Delta SOC_{E_{FC@0.8V}}[\%] = \left(\frac{E_{FC@0.8V}[kWh]}{Batt_{Capacity}[kWh]}\right) * 100 \quad \text{EQN. 13}$$

$$SOC\,0.8\,V[\%] = SOC_{baseline} + \Delta SOC_{E_{FC@0.8V}} \quad \text{EQN. 14}$$

where $P_{FC\,req}$ is the requested power from the fuel cell, $P_{FC\,tgt}$ is the target power output of the fuel cell (e.g., the power required to overcome the road load) $t_{FC@0.8V}$ is the temperature of the fuel cell at a power output of $P_{FC@0.8V}$, and $E_{FC@0.8V}$ is the energy contained in the battery when the fuel cell is at a power output of $P_{FC@0.8V}$. $SOC_{baseline}$ is the battery state of charge when the fuel cell power output is not limited. MAP($SOC_{HV\ Batt}$) is the mapping that relates road load power to SOC and vehicle speed, as shown in the examples of FIG. 11 and FIG. 13. This control regime allows the fuel cell to overcome the road load and the battery to provide any requested acceleration, while preventing the requested fuel cell power from falling below $P_{FC@0.8V}$ and potentially risking degradation of the fuel cell.

In the "margin for FC 0.7 V control" region 1230, control is governed by the following equations:

$$P_{FC@0.7V}[kW] = MAP(SOC_{HV\ Batt}) \quad \text{EQN. 15}$$

$$P_{FC\ req}[kW] = \max(P_{FC\ tgt}, P_{FC@0.7V}) \quad \text{EQN. 16}$$

$$E_{FC@0.7V}[kWh] = FCP_{@0.7V} * \frac{t_{FC@0.7V}}{3600} \quad \text{EQN. 17}$$

$$\Delta SOC_{E_{FC@0.7V}}[\%] = \left(\frac{E_{FC@0.7V}[kWh]}{Batt_{Capacity}[kWh]}\right) * 100 \quad \text{EQN. 18}$$

$$SOC\ 0.7\ V[\%] = SOC_{baseline} - \Delta SOC_{E_{FC@0.7V}} \quad \text{EQN. 19}$$

This control regime allows the fuel cell to overcome the road load and the battery to provide any requested acceleration, while preventing the requested fuel cell power from exceeding $P_{FC@0.7V}$ and potentially risking degradation of the fuel cell.

In the "margin for drive cycle HV battery energy requirements" region 1240, the vehicle is being asked to climb a hill, pass another vehicle, or perform other maneuvers that create a power request gap (as shown for example in FIG. 7). In this case, the fuel cell power output 520 is allowed to exceed $P_{FC@0.7V}$, up to a maximum value of $P_{FC\ Max}$, which is the maximum power output the fuel cell is capable of delivering. Thus, even at the cost of some degradation of the fuel cell over time, this control regime prioritizes meeting the acceleration requests of the driver with the full capability of the fuel fell, battery, and motor, as failing to do so could have significant safety and driver satisfaction implications.

FIG. 13 is an example graph or mapping 1300 showing the fuel cell output power 1310 (e.g., in kilowatts) required to balance the battery SOC, in relation to vehicle speed 1020 (e.g., in kilometers per hour) and battery state of charge (SOC) 1110, in accordance with at least one embodiment of the present disclosure.

As described above, there are many unknowns and measurement errors in the kinetic energy (KE) and road load estimation equations. One method to account for the error is to calculate expected minimum and maximum accumulated variance in the KE and road load estimations and let the system naturally balance between fuel cell power and HV battery power at the actual road load vs KE point at the measured vehicle speed. For a measured vehicle speed, the actual road load/KE will be between the expected minimum and maximum accumulated variance in the KE and road load estimations (FIG. 13 is based on a flat road (grade=0%), although other road grades may be used instead or in addition). In an example, for a given speed, HV battery SOC will increase/decrease until the fuel cell power output is equal to the actual road load.

This control is implemented as a battery power request map (sometimes known as a P-Charge map), wherein a negative value means it's desirable to add power to the FC power request, and a positive value means it's desirable to subtract from power from the FC power request. The min/max accumulated variances are defined as boundaries. There are three "boundaries" defined for this implementation:

Minimum accumulated variance at 0% slope
Maximum accumulated variance at 0% slope
Maximum accumulated variance at 8% slope (worst plausible case for legal U.S. roadways).

The ASOC between boundaries is based on KE, and/or on SOC recovery within a target time, with an intention of increasing FC power until the HV battery SOC balances (e.g., FC power output is equal to the hill climb power). Once slope<=0, the goal is to recover SOC to a state of maximum charge (e.g., 75%) within a target time. The 0 kW surface is for 0.8V control.

The example mapping 1300 applies to a particular vehicle (e.g., a tractor-trailer vehicle that may or may not have a trailer attached, which may or may not be fully loaded, and thus an unknown mass within a possible range of 22 Klbs-82 Klbs), and takes into account an unknown road grade within a range of 0% to 8%, and assumes a 30-second recovery time (e.g., a time to resume charging of the battery) and a 600 second charging time to recharge a fully depleted battery. Other vehicles and value ranges may be used instead or in addition. This mapping may be generated at the time of vehicle manufacture or service, or may be computed within the vehicle on a periodic or continuous basis.

The mapping 1300 includes a depleted battery region 1320 where the battery SOC is less than 65%, and the required power 1310 is equal to the maximum power output of the fuel cell $P_{FC\ max}$, regardless of the vehicle speed.

The mapping 1300 also includes an 8% grade region 1330 bounded by an 8% grade maximum road load boundary 1340. In the 8% grade region, the required power output 1310 from the fuel cell is a steep function of vehicle speed and battery SOC.

The mapping 1300 also includes an intermediate road grade region 1350 bounded by the 8% grade maximum road load boundary 1340 and a 0% grade maximum road load boundary 1360. In the intermediate road grade region 1350, the required power from the fuel cell is selected such that the SOC will balance (e.g., the fuel cell power management system will stop depleting the battery) within 30 seconds after the road grade levels out to 0%.

The mapping 1300 also includes a 0% grade acceleration region 1370 where changes in the SOC of the battery are directly proportional to changes in the kinetic energy of the vehicle, as shown for example in FIG. 11, and so the required power output 1310 is equal to the road load as shown in FIG. 11. The 0% grade acceleration region 1370 is bounded by the 0% grade maximum road load boundary 1360 and a zero-acceleration boundary 1380. In this example, the fuel cell power management system does not calculate the road load directly, but rather calculates the possible road load maximum and minimum bounds, then balances to the actual road load between those bounds (e.g., by driving ASOC to zero).

The mapping 1300 also includes a 0% grade battery charging region 1390, which is bounded by the zero-acceleration boundary 1380. Within the 0% grade battery charging region 1390, the required fuel cell power output 1310 is equal to $P_{FC@0.8V}$, regardless of vehicle speed or battery SOC until such time as the battery is charged to an SOC of 75%. It is noted that the HV battery SOC margin for regeneration can be calibrated based on the application. 75% in this instance does not imply the maximum HV battery SOC permitted by the vehicle, or by the fuel cell power management system. In most cases, the maximum allowed HV battery SOC is specific to the battery being used.

The mapping 1300 also includes a battery fully charged region 1395 wherein the battery SOC is greater than 75%, and no further charging of the battery by the fuel cell is desired. Within the battery fully charged region 1395, the desired power output 1310 of the fuel cell is set to zero, regardless of vehicle speed or battery SOC. In this example, above 75% SOC, the fuel cell will not charge the HV battery, and all charging of the HV battery will come, for example, from regenerative braking.

It is noted that the desired fuel cell power output 1310 shown in FIG. 13 is a traction power output required to meet the motor power request. Any difference between the motor power request and the traction power output of the fuel cell may be made up by additional traction power from the battery. A person of ordinary skill in the art will appreciate that, in some implementations, other vehicle systems, including lighting, climate control, entertainment systems, communication systems, etc. may have additional, non-traction power demands that may or may not be met by the fuel cell and/or hybrid battery. Such implementations explicitly fall within the scope of the present disclosure.

Figure 14:
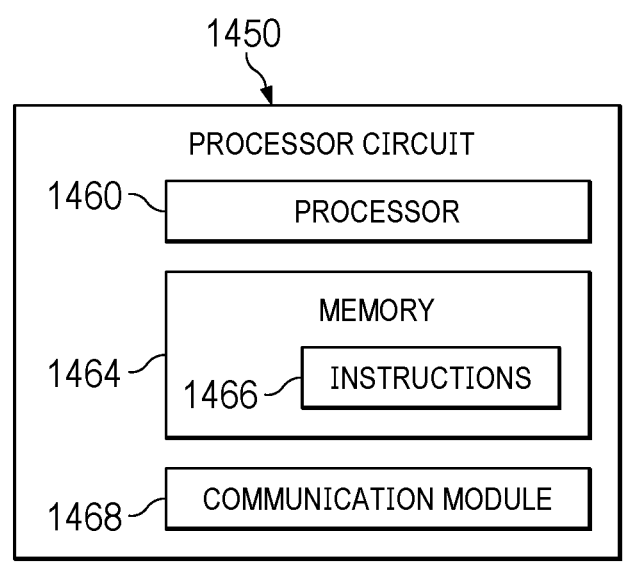
FIG. 14 is a schematic diagram of a processor circuit, according to embodiments of the present disclosure.

FIG. 14 is a schematic diagram of a processor circuit 1450, in accordance with at least one embodiment of the present disclosure. The processor circuit 1450 may be implemented in the system 100, the VCU 110, power train ECU 113, or other devices or workstations (e.g., third-party workstations, network routers, etc.), or on a cloud processor or other remote processing unit, as necessary to implement the method. As shown, the processor circuit 1450 may include a processor 1460, a memory 1464, and a communication module 1468. These elements may be in direct or indirect communication with each other, for example via one or more buses.

The processor 1460 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1460 may also comprise another hardware device, a firmware device, or any combination thereof configured to perform the operations described herein. The processor 1460 may also be implemented as a combination of computing devices, e.g., a combination of a DSP and a microprocessor, a plurality of microprocessors, one or more microprocessors in conjunction with a DSP core, or any other such configuration.

The memory 1464 may include a cache memory (e.g., a cache memory of the processor 1460), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1464 includes a non-transitory computer-readable medium. The memory 1464 may store instructions 1466. The instructions 1466 may include instructions that, when executed by the processor 1460, cause the processor 1460 to perform the operations described herein. Instructions 1466 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1468 can include any electronic circuitry and/or logic circuitry to facilitate direct or indirect communication of data between the processor circuit 1450, and other processors or devices. In that regard, the communication module 1468 can be an input/output (I/O) device. In some instances, the communication module 1468 facilitates direct or indirect communication between various elements of the processor circuit 1450 and/or the system 100. The communication module 1468 may communicate within the processor circuit 1450 through numerous methods or protocols. Serial communication protocols may include but are not limited to United States Serial Protocol Interface (US SPI), Inter-Integrated Circuit (I$^2$C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and a central server, or readings from the sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 15:
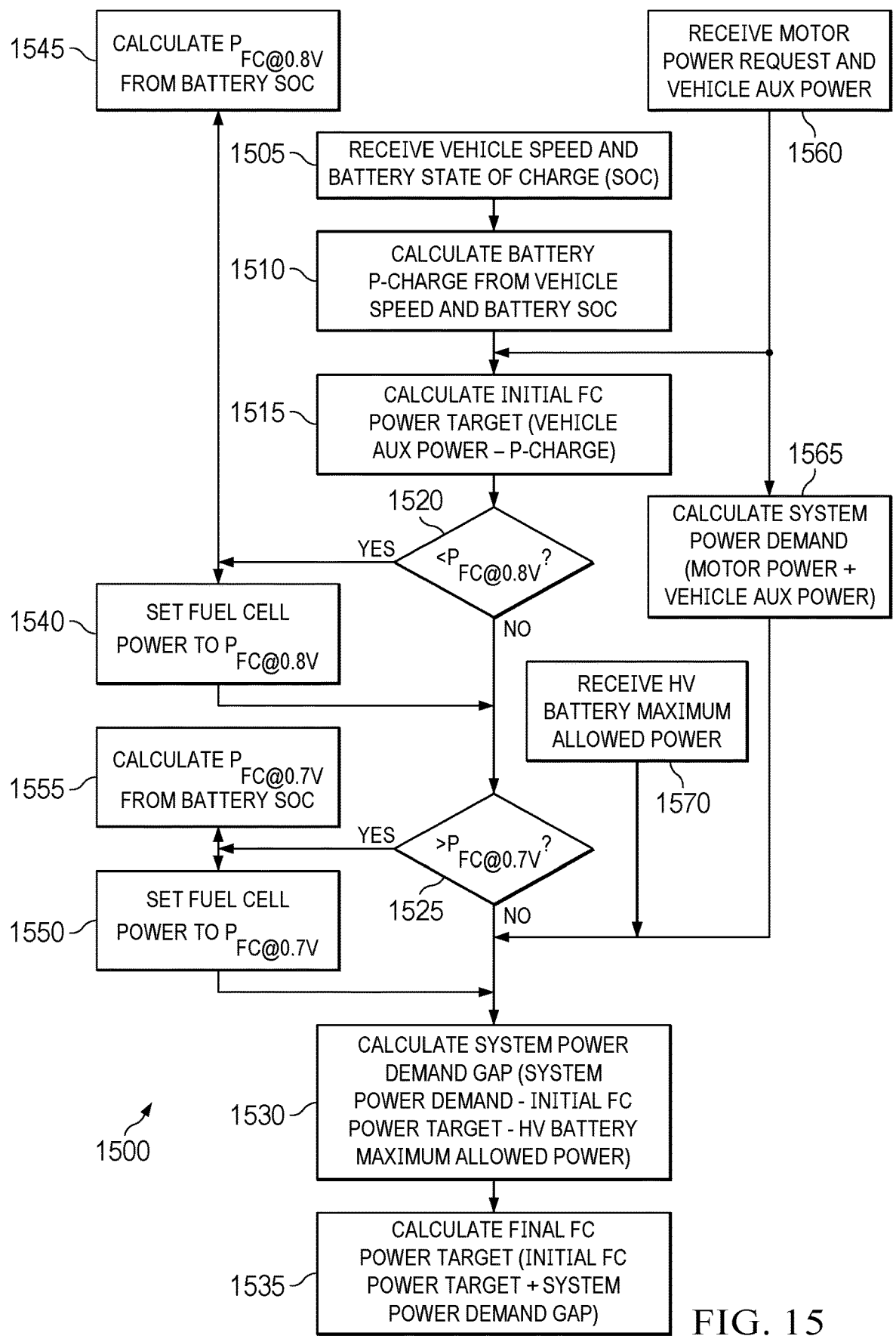
FIG. 15 is a schematic, diagrammatic representation, in flow diagram form, of an example fuel cell power management method, in accordance with at least one embodiment of the present disclosure.

FIG. 15 is a schematic, diagrammatic representation, in flow diagram form, of an example fuel cell power management method 1500, in accordance with at least one embodiment of the present disclosure.

In step 1505, the method 1500 includes receiving the vehicle speed and Battery state of charge (e.g., from the speedometer 270, battery charge sensor 114 and/or battery load sensor 280 of FIG. 2). Execution then proceeds to step 1510.

In step 1510, the method 1500 includes calculating the battery P-charge (e.g., the power charge or desired power output from the battery) from. Execution then proceeds to step 1515.

In step 1515, the method 1500 includes calculating the initial fuel cell power output target as a function of the vehicle auxiliary power (e.g., the power required to overcome non-conservative forces other than road load) minus the calculated P-charge. Execution then proceeds to step 1520.

In step 1520, the method 1500 includes determining whether the initial fuel cell power output target is less than the power output of the fuel cell at 0.8 volts. If yes, execution proceeds to step 1540. If no, execution proceeds to step 1525.

In step 1525, the method 1500 includes determining whether the initial fuel cell power output target is greater than the power output of the fuel cell at 0.7 volts. If yes, execution proceeds to step 1550. If no, execution proceeds to step 1530.

In step 1530, the method 1500 includes calculating a system power demand gap as a function of the system power demand minus the initial fuel cell power output target minus the maximum allowed power output of the hybrid vehicle battery. Execution then proceeds to step 1535.

In step 1535, the method 1500 includes calculating the final fuel cell power output target as a function of the initial fuel cell power output target plus the system ower demand gap. The method 1500 is now complete.

In step 1540, the method 1500 includes calling step 1545 and then setting the fuel cell power output to the power output at 0.8 volts. Execution then proceeds to step 1525.

In step 1545, the method 1500 includes calculating the fuel cell power output at 0.8 volts based on the current battery state of charge. Execution then returns to step 1540.

In step 1550, the method 1500 includes calling step 1555 and then setting the fuel cell power output to the power output at 0.7 volts. Execution then proceeds to step 1530.

In step 1555, the method 1500 includes calculating the fuel call power output at 0.7 volts based on the current battery state of charge. Execution then returns to step 1550.

In step 1560, the method 1500 includes receiving the motor power request and the vehicle auxiliary power. Execution then proceeds to step 1565.

In step 1565, the method 1500 includes calculating the system power demand as a function of the motor power plus the vehicle auxiliary power. Execution then proceeds to step 1530.

In step 1570, the method 1500 includes receiving the maximum allowed power for the hybrid vehicle battery. Execution then proceeds to step 1530.

It is notes that steps 1505, 1560, and 1570 may occur in parallel (e.g., within a single iteration step of the fuel cell power management system), which may lead to other steps also occurring in parallel.

As will be readily appreciated by those having ordinary skill in the art after becoming familiar with the teachings herein, the fuel cell power management system advantageously minimizes overvoltage, undervoltage, and voltage transient conditions that can degrade the fuel cell over time, without sacrificing the responsiveness of the vehicle. Depending on the implementation, a number of variations are possible on the examples and embodiments described above. For example, the technology may be applied to different vehicle types, including cargo vehicles such as trucks, passenger vehicles such as cars, vans, and buses, on-road and off-road vehicles, two-wheeled, three-wheeled, four-wheeled, and multi-wheeled vehicles, manually operated vehicles, partially autonomous vehicles, and fully autonomous vehicles. Depending on the implementation, the fuel cell power management system may be applicable to any vehicle that has both a fuel cell and a battery, and experience both conservative/transient/recoverable forces and slowly changing, non-conservative/non-recoverable forces. Other variables and other logical or arithmetic operations may be employed than those described above, in order to achieve the desired effect of balancing the power load between the fuel cell and battery in a manner that minimizes overvoltage, undervoltage, and voltage transients.

The logical operations making up the embodiments of the technology described herein are referred to variously as operations, steps, objects, elements, components, layers, or modules. It should be understood that these may occur or be performed or arranged in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the fuel cell power management system or its components. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

The above specification, examples and data provide an enabling description of the structure and use of exemplary embodiments of the fuel cell power management system as defined in the claims. Although various embodiments of the claimed subject matter have been described above with a certain degree of particularity, or with reference to one or more individual embodiments, those skilled in the art would understand that numerous alterations to the disclosed embodiments are contemplated without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A vehicle comprising a fuel cell power management system, the system comprising:
   a fuel cell;
   a battery;
   a charge sensor operatively coupled to the battery and configured to measure a battery charge of the battery;
   a speedometer configured to measure a speed of the vehicle;
   a processor comprising a memory and configured to:
      calculate a mapping of desired fuel cell power output as a function of the battery charge and the speed of the vehicle;
      using the mapping, the battery charge, the speed of the vehicle, and a motor power request, calculate a desired traction power output of the fuel cell;
      set a traction power output of the fuel cell to the desired traction power output of the fuel cell;

set a desired traction power output of the battery to the motor power request minus the traction power output of the fuel cell; and set a traction power output of the battery to the desired traction power output of the battery.

2. The vehicle of claim 1, wherein the processor is further configured to, if the desired traction power output of the battery exceeds a maximum power output of the battery, increase the desired traction power output of the fuel cell by an amount equal to the exceedance.

3. The vehicle of claim 2, wherein the processor is further configured to, if the increased desired traction power output of the fuel cell exceeds a maximum power output of the fuel cell, set the desired traction power output of the fuel cell equal to the maximum power output of the fuel cell.

4. The vehicle of claim 1, wherein the processor is further configured to, if the desired traction power output of the fuel cell is greater than a first threshold value, set the desired traction power output of the fuel cell equal to the first threshold value.

5. The vehicle of claim 4, wherein the first threshold value is associated with a fuel cell voltage of 0.7 volts.

6. The vehicle of claim 1, wherein the processor is further configured to, if the desired traction power output of the fuel cell is less than a second threshold value, set the desired traction power output of the fuel cell equal to the second threshold value.

7. The vehicle of claim 6, wherein the second threshold value is associated with a fuel cell voltage of 0.8 volts.

8. The vehicle of claim 1, wherein the processor is further configured to, if the battery charge exceeds a third threshold value, setting the desired traction power output of the fuel cell to zero.

9. The vehicle of claim 8, wherein the third threshold value is 75%.

10. The vehicle of claim 8, wherein the processor is further configured to, if the battery charge does not exceed the third threshold value, using at least some of the traction power output of the fuel cell to charge the battery, and setting the traction power output of the fuel cell at a level that will charge the battery within a specified amount of time.

11. The vehicle of claim 10, wherein the specified amount of time is 600 seconds.

12. The vehicle of claim 1, wherein the desired traction power output of the fuel cell is sufficient to overcome an actual road load of the vehicle.

13. The vehicle of claim 1, wherein the desired traction power output of the battery is sufficient to accelerate the vehicle.

14. A method for fuel cell power management, the method comprising:
with a processor comprising a memory:
measuring a battery charge of a battery of the vehicle;
measuring a speed of the vehicle;
calculating a mapping of desired fuel cell power output as a function of the battery charge and the speed of the vehicle;
using the mapping, the battery charge, the speed of the vehicle, and a motor power request, calculating a desired traction power output of a fuel cell of the vehicle;
setting a traction power output of the fuel cell to the desired traction power output of the fuel cell;
setting a desired traction power output of the battery to the motor power request minus the traction power output of the fuel cell; and
setting a traction power output of the battery to the desired traction power output of the battery.

15. The method of claim 14, further comprising:
if the desired traction power output of the fuel cell is greater than a first threshold value associated with a fuel cell voltage of 0.7 volts, setting the desired traction power output of the fuel cell equal to the first threshold value.

16. The method of claim 14, further comprising: if the desired traction power output of the fuel cell is less than a second threshold value associated with a fuel cell voltage of 0.8 volts, setting the desired traction power output of the fuel cell equal to the second threshold value.

17. The method of claim 14, wherein the desired traction power output of the fuel cell is sufficient to overcome an actual road load of the vehicle.

18. The method of claim 14, wherein the desired traction power output of the battery is sufficient to accelerate the vehicle.

19. A fuel cell power management system, the system comprising:
a vehicle;
a fuel cell disposed within the vehicle;
a battery disposed within the vehicle;
a charge sensor operatively coupled to the battery and configured to measure a battery charge of the battery;
a speedometer configured to measure a speed of the vehicle;
a processor disposed within the vehicle and comprising a memory and configured to:
calculate a mapping of desired fuel cell power output as a function of the battery charge and the speed of the vehicle;
using the mapping, the battery charge, the speed of the vehicle, and a motor power request, calculate a desired traction power output of the fuel cell;
set a desired traction power output of the battery to the motor power request minus the desired traction power output of the fuel cell;
if the desired traction power output of the battery exceeds a maximum power output of the battery, increase the desired traction power output of the fuel cell by an amount equal to the exceedance;
if the increased desired traction power output of the fuel cell exceeds a maximum power output of the fuel cell, set the desired traction power output of the fuel cell equal to the maximum power output of the fuel cell;
set a traction power output of the fuel cell to the desired traction power output of the fuel cell; and
set a traction power output of the battery to the desired traction power output of the battery.

20. The fuel cell power management system of claim 19, wherein the processor is further configured to:
if the desired traction power output of the fuel cell is greater than a first threshold value associated with a fuel cell voltage of 0.7 volts, set the desired traction power output of the fuel cell equal to the first threshold value; and
if the desired traction power output of the fuel cell is less than a second threshold value associated with a fuel cell voltage of 0.8 volts, set the desired traction power output of the fuel cell equal to the second threshold value.

\* \* \* \* \*